(12) United States Patent
Lynch

(10) Patent No.: US 9,256,961 B2
(45) Date of Patent: *Feb. 9, 2016

(54) ALTERNATE VIEWPOINT IMAGE ENHANCEMENT

(75) Inventor: James D. Lynch, Chicago, IL (US)

(73) Assignee: HERE Global B.V., Veldhoven (NL)

( * ) Notice: Subject to any disclaimer, the term of this patent is extended or adjusted under 35 U.S.C. 154(b) by 410 days.

This patent is subject to a terminal disclaimer.

(21) Appl. No.: 13/536,536

(22) Filed: Jun. 28, 2012

(65) Prior Publication Data

US 2014/0002439 A1    Jan. 2, 2014

(51) Int. Cl.
| | |
|---|---|
| *G06T 15/00* | (2011.01) |
| *G06T 11/00* | (2006.01) |
| *G06T 19/00* | (2011.01) |
| *G01C 21/36* | (2006.01) |
| *G06F 17/30* | (2006.01) |
| *G09B 29/00* | (2006.01) |
| *G06T 15/20* | (2011.01) |

(52) U.S. Cl.
CPC .............. *G06T 11/00* (2013.01); *G01C 21/367* (2013.01); *G06F 17/30241* (2013.01); *G06T 15/20* (2013.01); *G06T 19/003* (2013.01); *G09B 29/007* (2013.01)

(58) Field of Classification Search
None
See application file for complete search history.

(56) References Cited

U.S. PATENT DOCUMENTS

| | | | |
|---|---|---|---|
| 6,895,126 B2 | 5/2005 | Di Bernardo et al. | |
| 7,577,316 B2 | 8/2009 | Di Bernardo et al. | |
| 7,978,207 B1 | 7/2011 | Herf et al. | |
| 8,493,408 B2 | 7/2013 | Williamson et al. | |
| 8,890,863 B1 | 11/2014 | Lininger | |
| 2001/0010546 A1 | 8/2001 | Chen | |
| 2003/0208771 A1 | 11/2003 | Hensgen et al. | |
| 2005/0190972 A1* | 9/2005 | Thomas et al. | 382/218 |
| 2005/0270286 A1* | 12/2005 | Hirvonen et al. | 345/422 |
| 2006/0247855 A1 | 11/2006 | de Silva et al. | |
| 2007/0216189 A1 | 9/2007 | Matsumoto et al. | |
| 2008/0043020 A1 | 2/2008 | Snow et al. | |
| 2008/0266142 A1 | 10/2008 | Sula et al. | |

(Continued)

FOREIGN PATENT DOCUMENTS

| | | |
|---|---|---|
| EP | 1024347 B1 | 2/2008 |
| EP | 1921419 A4 | 9/2011 |

OTHER PUBLICATIONS

Hile et al. "Landmark-Based Pedestrian Navigation from Collections of Geotagged Photos", MUC, Dec. 3-5, 2008, p. 145-152.*

(Continued)

*Primary Examiner* — Yingchun He
(74) *Attorney, Agent, or Firm* — Lempia Summerfield Katz LLC

(57) ABSTRACT

In one embodiment, panoramic images, images bubbles, or any two-dimensional views of three-dimensional subject matter are enhanced with one or more alternate viewpoints. A controller receives data indicative of a point on the two-dimensional perspective and accesses a three-dimensional location based on the point. The controller selects an image bubble based on the three-dimensional location. The three-dimensional location may be determined according to a depth map corresponding to the point. A portion of the image bubble is extracted and incorporated into the two-dimensional perspective. The resulting image may be a seamless enhanced resolution image or include a picture-in-picture enhanced resolution window including subject matter surrounding the selected point.

20 Claims, 15 Drawing Sheets

(56) References Cited

U.S. PATENT DOCUMENTS

| | | | |
|---|---|---|---|
| 2009/0153549 A1* | 6/2009 | Lynch et al. | 345/419 |
| 2009/0213112 A1 | 8/2009 | Zhu et al. | |
| 2009/0240431 A1 | 9/2009 | Chau et al. | |
| 2009/0245691 A1 | 10/2009 | Naimark et al. | |
| 2009/0297067 A1 | 12/2009 | Yang | |
| 2010/0004995 A1 | 1/2010 | Hickman | |
| 2010/0045678 A1 | 2/2010 | Reid | |
| 2010/0138153 A1 | 6/2010 | Abe et al. | |
| 2010/0215250 A1* | 8/2010 | Zhu | 382/154 |
| 2010/0265177 A1* | 10/2010 | Fujimoto et al. | 345/162 |
| 2010/0268452 A1 | 10/2010 | Kindo et al. | |
| 2010/0325589 A1 | 12/2010 | Ofek et al. | |
| 2011/0181711 A1 | 7/2011 | Reid | |
| 2011/0268316 A1* | 11/2011 | Bronder et al. | 382/103 |
| 2011/0283223 A1 | 11/2011 | Vaittinen et al. | |
| 2012/0033032 A1 | 2/2012 | Kankainen | |
| 2012/0197464 A1* | 8/2012 | Wang et al. | 701/2 |
| 2013/0162665 A1 | 6/2013 | Lynch | |
| 2013/0169668 A1 | 7/2013 | Lynch | |
| 2014/0002439 A1 | 1/2014 | Lynch | |
| 2014/0002440 A1 | 1/2014 | Lynch | |

OTHER PUBLICATIONS

Farley, "Zoom In With A jQuery Plugin", downloaded @ http://www.sitepoint.com/zoom-in-with-a-jquery-plugin/, published Jul. 27, 2009.*

U.S. Appl. No. 13/332,718, filed Dec. 21, 2011, Lynch.

U.S. Appl. No. 13/340,923, filed Dec. 30, 2011, Lynch.

U.S. Appl. No. 13/536,589, filed Jun. 28, 2012, Lynch.

"Visit global landmarks with photo tours in Google Maps", downloaded @http://google-latlong.blogspot.com/2012/04/visit-global-landmarks-with-photo-tours.html; Apr. 25, 2012.

* cited by examiner

ALTERNATE VIEWPOINT IMAGE ENHANCEMENT

FIELD

The following disclosure relates to the enhancement of images in navigation-related and/or mapping-related applications.

BACKGROUND

Conventional street view involves the manipulation of image bubbles. Image bubbles are panoramic images collected with respect to a single perspective. The image bubbles may extend nearly 360 degrees along one or more axes. Zooming and panning within an image bubble provides a view from a particular viewpoint but cannot provide any perspective of the view with respect to surrounding areas. To view another perspective, a typical street level viewing application must be switched to the next image bubble. That is, in order to view the scene further down the street, a user selects a direction to move to the next image bubble and waits for the next image bubble to load. A panning operation within a same bubble may also be required, resulting in loading multiple images. These operations are tedious and require time and bandwidth to load multiple images and/or image bubbles.

SUMMARY

In one embodiment, panoramic images, images bubbles, or any two-dimensional views of three-dimensional subject matter are enhanced with one or more alternate viewpoints. A controller receives data indicative of a point on the two-dimensional perspective and accesses a three-dimensional location based on the point. The controller selects an image bubble based on the three-dimensional location. The three-dimensional location may be determined according to a depth map corresponding to the point. A portion of the image bubble is extracted and incorporated into the two-dimensional perspective. The resulting image may be a seamless enhanced resolution image formed from multiple image bubbles or an image that includes a picture-in-picture enhanced resolution inset including subject matter surrounding the selected point.

BRIEF DESCRIPTION OF THE DRAWINGS

Exemplary embodiments of the present invention are described herein with reference to the following drawings.

DETAILED DESCRIPTION

The disclosed embodiments relate to methods and systems for enhancing a street side image with another street side image. The two images are captured from different geographical areas and/or different perspectives. The current image as used in a map-related or navigation-related application is combined with the other image, which may have been captured down the street or at a nearby location. In one embodiment, the images are combined to form a seamless composite image. The composite image includes portions of images captured at multiple locations. The multiple locations are closer to the subject matter in different portions of the composite image. Therefore, the composite image may have a greater spatial resolution than any of the captured images. In another embodiment, the image captured down the street or at a nearby location, is used to see around or through an obstacle or to provide a zoomed-in view of an object. The second image may be presented in a window or a picture-in-picture arranged in the current image.

Figure 1:
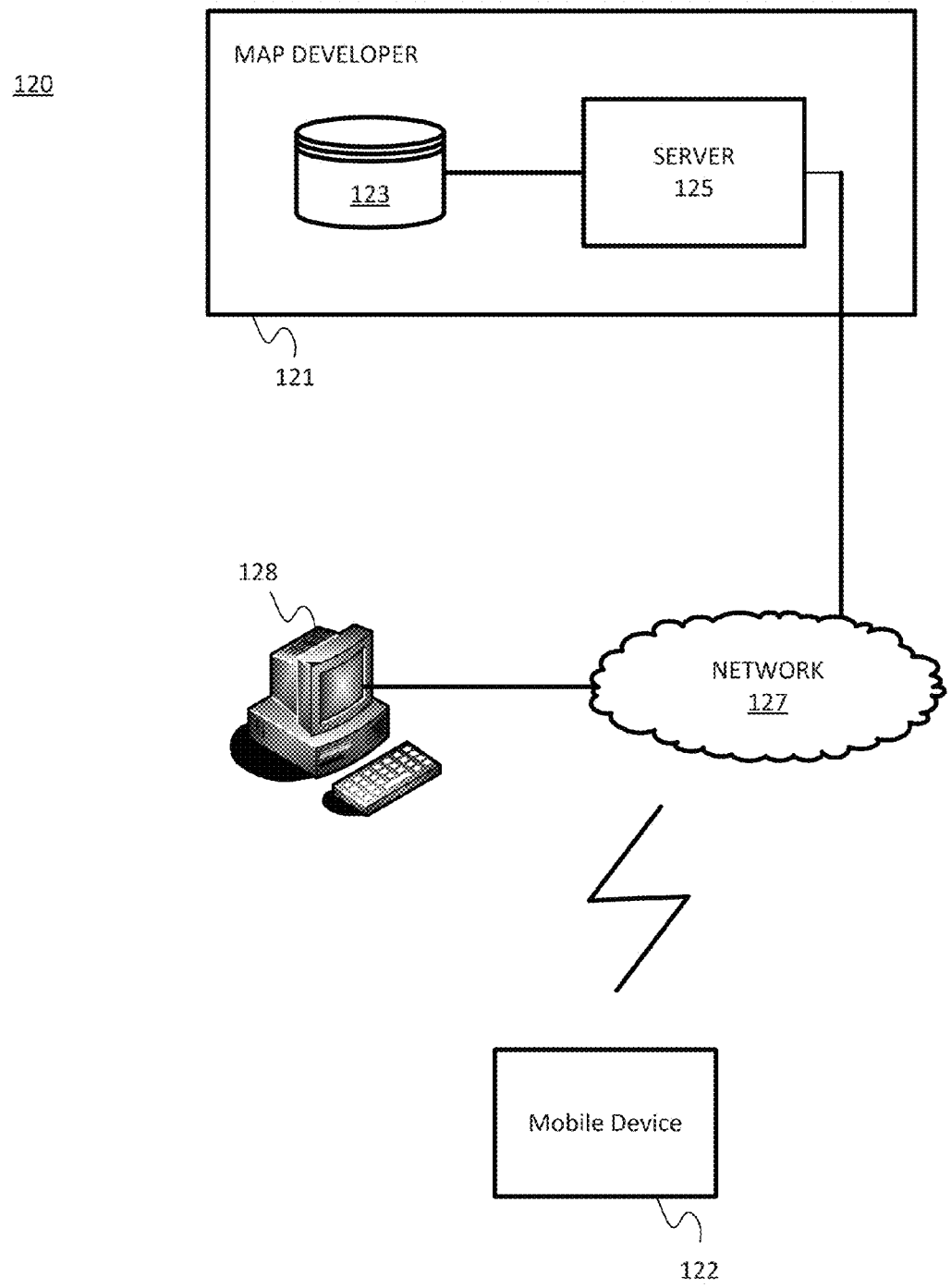
FIG. 1 illustrates an exemplary navigation system.

FIG. 1 illustrates an exemplary navigation system 120. The navigation system 120 includes a map developer system 121, a mobile device 122, a workstation 128, and a network 127. Additional, different, or fewer components may be provided. For example, many mobile devices 122 and/or workstations 128 connect with the network 127.

The developer system 121 includes a server 125 and a database 123. The optional workstation 128 is a general purpose computer including programming specialized for the following embodiments. The workstation 128 includes at least a memory, a processor, and a communication interface. The developer system 121 may include computer systems and networks of a system operator (e.g., NAVTEQ or Nokia Corp.).

The mobile device 122 is a smart phone, a mobile phone, a personal digital assistant ("PDA"), a tablet computer, a notebook computer, a personal navigation device ("PND"), a portable navigation device, and/or any other known or later developed portable or mobile device. The mobile device 122 includes one or more detectors or sensors as a positioning system built or embedded into or within the interior of the mobile device 122. Alternatively, the mobile device 122 uses communications signals for position determination. The mobile device 122 receives location data from the positioning system.

The developer system 121, the workstation 128, and the mobile device 122 are coupled with the network 127. The phrase "coupled with" is defined to mean directly connected to or indirectly connected through one or more intermediate components. Such intermediate components may include hardware and/or software-based components.

The computing resources necessary for enhancing an image with an alternative viewpoint may be divided between the server 125 and the mobile device 122. In some embodiments, the server 125 performs a majority of the processing ("server-based embodiments"). In other embodiments, the mobile device 122 or the workstation 128 performs a majority of the processing ("endpoint-based embodiments"). In addition, the processing is divided substantially evenly between the server 125 and the mobile device 122 or workstation 128 ("hybrid embodiments"). As an example, the following initial discussion focuses on server-based embodiments.

In the server-based embodiments, an image is displayed on workstation 128 or mobile device 122. The image may be part of an image bubble, which is a type of a panoramic photograph of a geographic region. The image may be referred to as a two-dimensional perspective.

The server 125 is configured to receive data indicative of a point on the two-dimensional perspective. Based on the subject matter of the image, the point is associated with a desired object. The point may be a selection made by a user at the workstation 128 or mobile device 122. Alternatively, the point may be determined internally by server 125. For example, the server 125 may select the point by analyzing the image to determine where higher spatial resolution or an alternate view may be desirable. The server 125 may also select a point based on a map database, navigation route, or destination point of interest.

The server 125 accesses data indicative of a three-dimensional location of the selected point. The three-dimensional location may be determined using a depth map associated with the two-dimensional perspective. The depth map is an image whose pixels are made up of depth values. The depth values may be referenced to the location where the depth map was generated, which may be referred to as the origin. The origin may be the same location that the two-dimensional perspective image was captured. The depth values may correspond to distances from the origin to the objects depicted in the image.

The server 125 references the point in the two-dimensional perspective image in a lookup of the depth map. The server 125 receives a depth value from the depth map that corresponds to the point on the two-dimensional perspective image. Based on the depth value, the server 125 calculates the three-dimensional world location of the selection. The three-dimensional location is calculated using the position and orientation of the image bubble along with the vector direction of the selected point relative to the center and the distance along the vector as defined by the depth map. The three-dimensional location is then used to select an appropriate image bubble. The depth map may or may not have been collected from the origin of an image bubble. The image bubble may be the closest image bubble to the desired object at the point on the two-dimensional perspective image. The image bubble may be chosen such that the image has an unobstructed view of the selected point. The depth map may also provide a surface normal at the selected point. An image may be selected based on which image bubble has the best straight-on view of the surface. The server 125 incorporates at least a portion of the image bubble into the two-dimensional perspective image. The portion of the image bubble illustrates the desired object that was previously selected.

The database 123 may also store image bubbles and/or two-dimensional renderings of geographic regions as portions of the image bubbles. The image bubbles may be stored in a format such as JPEG, Bitmap, Pixmap, Tiff, or another format. The database 123 may store the depth maps or point clouds. Each value in the depth map or point cloud may be associated with a pixel in one or more image bubbles.

In addition, the database 123 of the navigation system 120 may be a geographic database. The geographic database 123 includes information about one or more geographic regions. Each road in the geographic region is composed of one or more road segments. A road segment represents a portion of the road. Each road segment is associated with two nodes (e.g., one node represents the point at one end of the road segment and the other node represents the point at the other end of the road segment). The node at either end of a road segment may correspond to a location at which the road meets another road, i.e., an intersection, or where the road dead-ends. The road segment data record may include data that indicate a speed limit or speed category (i.e., the maximum permitted vehicular speed of travel) on the represented road segment. The road segment data record may also include data that indicate a classification, such as a rank of a road segment that may correspond to its functional class. The road segment data may include data identifying what turn restrictions exist at each of the nodes which correspond to intersections at the ends of the road portion represented by the road segment, the name or names by which the represented road segment is known, the length of the road segment, the grade of the road segment, the street address ranges along the represented road segment, the permitted direction of vehicular travel on the represented road segment, whether the represented road segment is part of a controlled access road (such as an expressway), a ramp to a controlled access road, a bridge, a tunnel, a toll road, a ferry, and so on.

The geographic database 123 may be used for mapping related features or navigation related features. The navigation-related features may include a route calculation application. End users may access a route from an origin to a destination. The route calculation application determines the route for the end user to travel along the road segments to reach the desired destination. In order to calculate a route, the route calculation application is provided with data identifying a starting location (origin) and a desired destination location. In one embodiment, the starting location may be the end user's current position and the destination may be entered by the end user. Given at least the identification of the starting location (origin) and the desired destination location, the route calculation application determines one or more solution routes between the starting location and the destination location. A solution route is formed of a series of connected road segments over which the end user can travel from the starting location to the destination location. When the route calculation application calculates a route, the application accesses the geographic database 123 and obtains data that represent road segments around and between the starting location and the destination location. The road calculation application uses the data to determine at least one valid solution route from the starting location to the destination location.

The at least one valid solution route may be displayed to the user in the rendering of the geographic region such that addresses or points of interest along the route may be selected to display street side imagery. Further, an image that corresponds to the destination location, origin location, or any points of interest along the route may be extracted from corresponding image bubbles and displayed to the user in the rendering of the geographic region.

The route calculation application may attempt to find a solution route that takes the least time to travel. The segment cost or travel time for the particular represented road segment considers the type of road, such as freeway or residential street, speed limit and distance of the segment. In one embodiment, the route calculation application may consider traffic conditions to more accurately reflect actual travel time over the connected road segments. When the route calculation application determines one or more solution routes comprising the series of connected road segments, the travel times for each of the included connected road segments is summed to provide an estimated route travel time. Based on the route travel time, the route calculation application selects the quickest route. Once the route calculation application has selected the route, the route calculation application provides an output in the form of an ordered list identifying a plurality of road segments that form the continuous navigable route between the origin and the destination. In addition, the route calculation program provides an output of an estimated route travel time.

The map-related features may be any of the navigation-related features provided to the user without reference to the current location of the user or the device. In addition, map-related features may include display and manipulation of a map of a geographic region. The map-related features may be provided without navigation-related features. The road segments may be tied to the image bubbles and renderings of geographic regions.

Figure 2A:
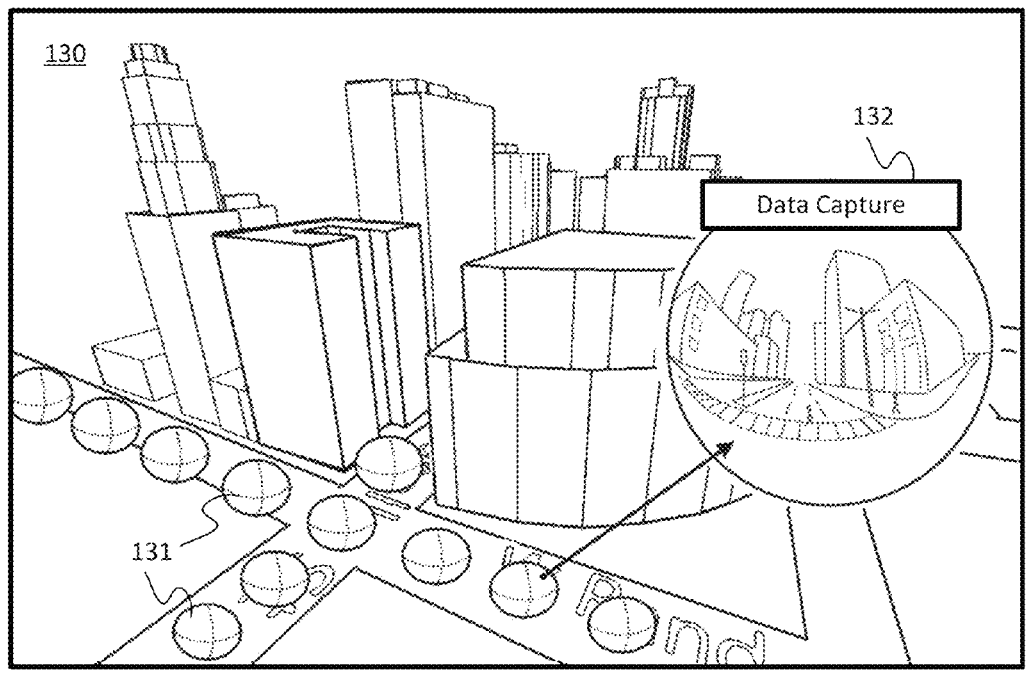
FIG. 2A illustrates an exemplary perspective view of a geographic region for data collection and the associated panoramic image bubbles.

FIG. 2A illustrates a geographic region 130 for data collection of image bubbles 131. The image bubbles 131 include photographic image data collected by a camera. Each image bubble may be a panoramic image 132 including a graphical representation of the geographic region 130. The image bubbles may have center points measured in Cartesian coordinates, such as an X-coordinate, a Y-coordinate, and a Z-coordinate and an orientation defined by up to three rotation angles. Each point on the image bubble is defined by the center point and one or more angles (e.g., roll, pitch, yaw). The camera may be mounted on a vehicle that moves along a street. The camera may collect an image bubble at regular time or distance intervals (e.g., 1 m, 4 m, 10 m, 1 second, 10 seconds, 100 milliseconds). The image bubbles are associated with the geographic location of the camera and/or vehicle at the time the image bubble is collected.

In addition, the vehicle may include a light detection and ranging (LiDAR) device that collects and gathers data points in a point cloud using optical remote sensing. The point cloud may be referred to as a depth map. Alternatively, the depth map may be derived from the point cloud. For example, the data points may be matched with image bubbles based on location. The data points include location coordinates and an on or off value. An intensity value may be included in place of the on or off value. Alternatively, the data points may include a distance value and two angle values to signify a location of a point in the point cloud. The point cloud may be stored in ASCII or LiDAR exchange format. One or more lasers of the LiDAR device may be in a near infrared spectrum (such as about 700 nm to about 5000 nm or about 800 nm to about 2500 nm) or another light spectrum.

Figure 2B:
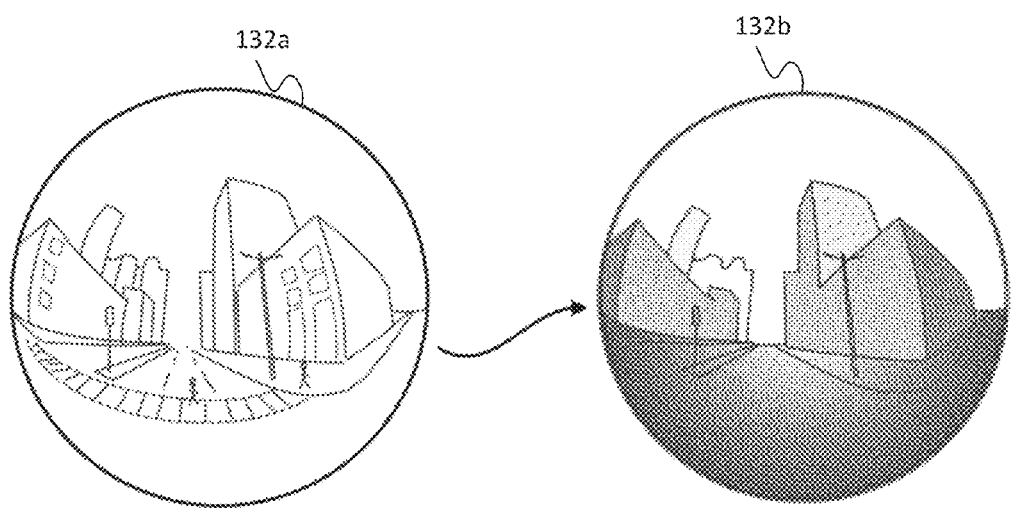
FIG. 2B illustrates exemplary panoramic image data and depth data collected in the region of FIG. 2A.

FIG. 2B illustrates exemplary image data and depth data collected in the region of FIG. 2A. FIG. 2B illustrates that some or all of the image pixels in the image bubble 132a have a corresponding value in the point cloud 132b defined by depth map data. In other words, the image bubble 132a is correlated to the point cloud 132b and underlying depth map.

Figure 3:
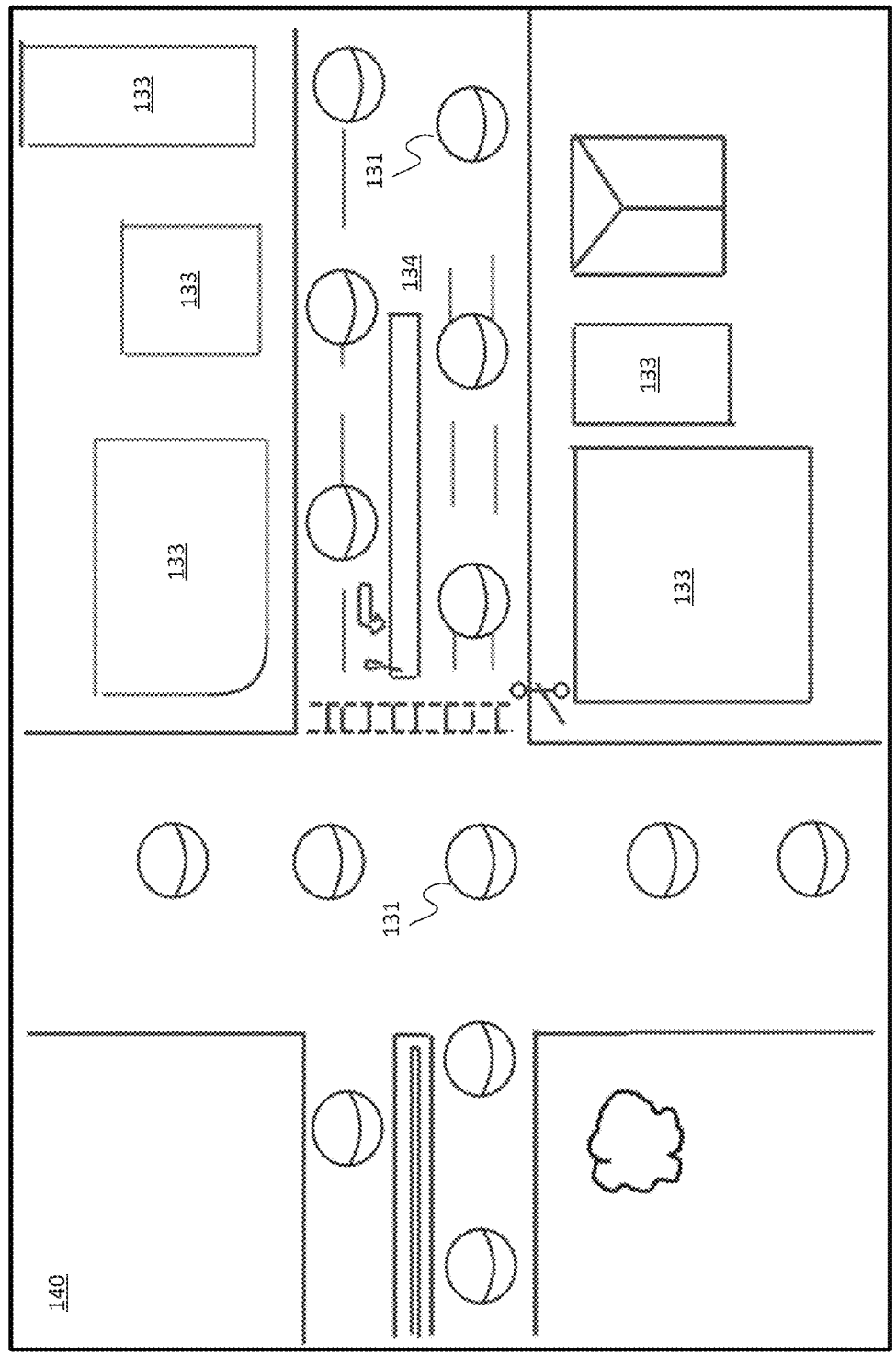
FIG. 3 illustrates an exemplary overhead view of a geographic region and associated panoramic image bubbles.

FIG. 3 illustrates an exemplary overhead view 140 of a geographic region 130 of FIG. 2A. The overhead view illustrates that the image bubbles 131 are spaced along the roadway 134. The location of each of the image bubbles 131 may be stored in database 123 as an address or association with road segments. The image bubbles 131 may include graphical representation of nearby buildings 133 and the roadway 134.

Figure 4:
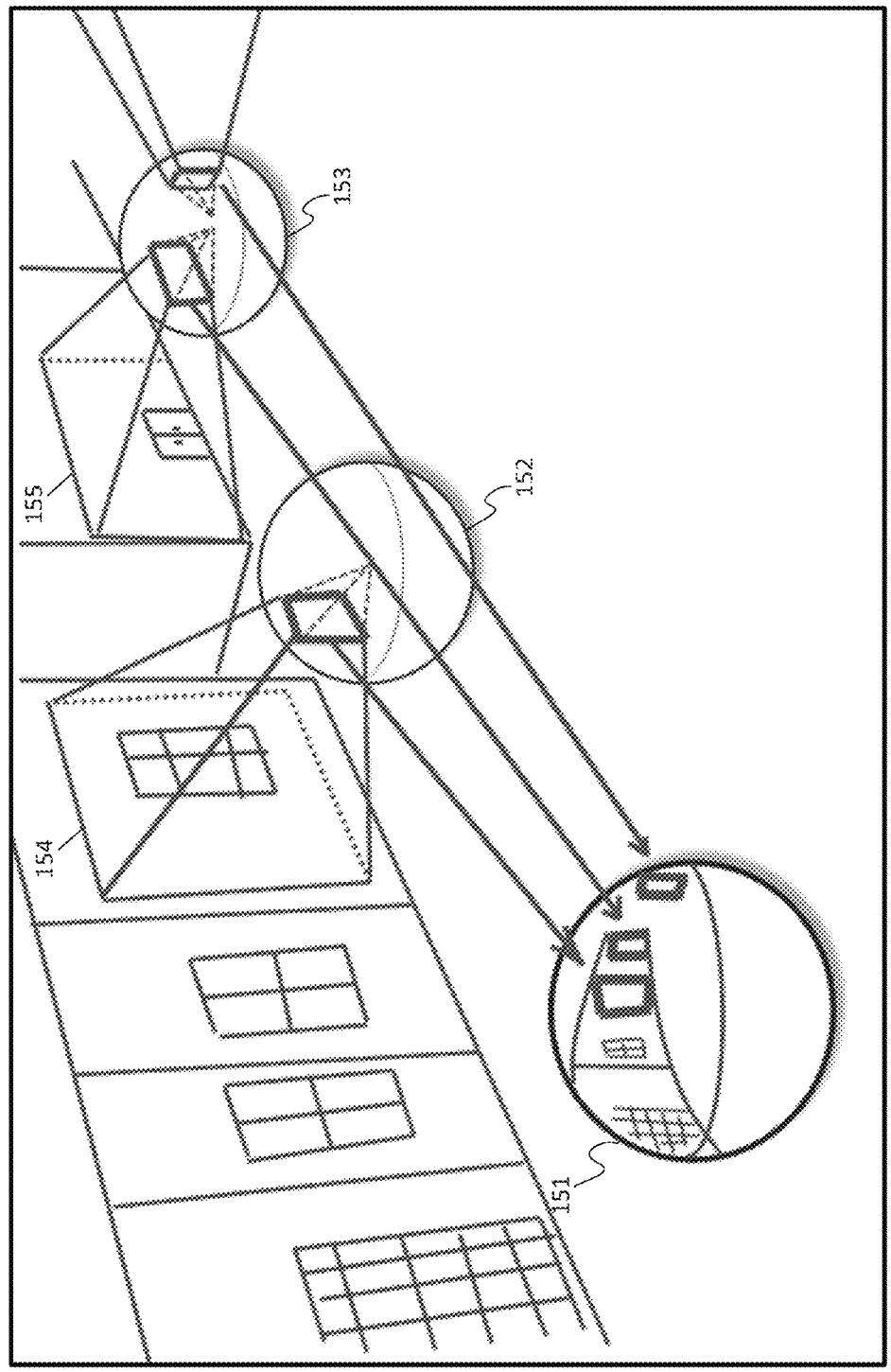
FIG. 4 illustrates exemplary composite image data of alternate viewpoints.

FIG. 4 illustrates an exemplary enhanced composite image 151. The composite image 151 may be stored as data representing a panoramic image. The super-resolution panoramic image is built form multiple image bubbles. For example, data from a first image bubble 152 is incorporated with data from a second image bubble 153. For example, data from the first image bubble 152 and data from the second image bubble 153 are combined to form the composite image data. More image bubbles may be used. The super-resolution panoramic image may have a spatial resolution that is greater than the first image bubble 152 resolution and the second image bubble 153 resolution. Spatial resolution is the number of independent pixel values per unit length. Spatial resolution may be measured in units of pixels per meter. The spatial resolution for an image may vary within the image depending on how far object in the image were from the camera. The spatial resolution describes how much physical detail can be viewed per unit length or the size of the smallest object that can be seen in the image. In addition, the view angle of bubbles 152 and 153 provide a better view angle of the building faces 154 and 155. The 'straight-on' view angles also provide a higher and more evenly distributed spatial resolution.

The original image bubble 151, the first image bubble 152 and the second image bubble 153 were captured from different positions and/or different perspectives. In one embodiment, the data of the first image bubble 152 and the data of the second image bubble 153 are combined to form an enhanced, composite version of image 151. The composite image 151 is a collage of multiple image bubbles. In another embodiment, the composite image 151 begins as an image derived from an image bubble, but the image bubble is augmented. The augmented image bubble incorporates portions of the first image bubble 152 and/or the second image bubble 153. The enhanced regions may be stored separately as individual regions that can be requested on demand. Additionally, the enhanced regions may be joined with the original image 151 to create a new super-resolution image 151b. The enhancement regions may be computed in real-time or may be pre-computed and stored for later use.

In either embodiment, the image bubbles are captured from different positions and/or perspectives. The depth maps, which may have been collected at the same times and locations as the image bubbles, are used to align the subject matter of the image bubbles. Consider the image of an object. The object is viewable from a current image bubble but relatively low image detail is included for the object in the current image bubble. The object's face may also be at a shallow angle to the camera and not clearly visible. A closer image bubble includes more detailed data for the object and may view the object face from a better view angle. Image data from the closer image bubble is projected onto a three-dimensional model. The three-dimensional model is the point cloud including depth values. The three-dimensional model may also be a previously generated polygon model. The data that was projected onto the three-dimensional model is transformed to the perspective of the current image bubble. Therefore, image data from the closer image bubble is superimposed onto the current image bubble in the orientation of the current image bubble such that in appears to increase the spatial resolution of the current image bubble. Far away objects in the current image bubble become clearer.

The server 123 may identify which portion of the current image bubble or the composite image data 151 should be augmented or enhanced. In one embodiment, all portions of the current image bubble or the composite image data 151 that include subject matter that is closer to another image bubble is enhanced. In another embodiment, the user selects a portion of the image to be enhanced using a cursor or touch screen.

In another embodiment, the server 123 is configured to identify objects of interest. The objects of interest may be significant buildings for route features as defined from a map database. The objects of interest may be any object with a flat surface greater than a threshold size. The threshold size may be measured in pixels (e.g., 100, 1000, or 10,000 pixels) or by distance (e.g., 1 foot, 1 meter, or 10 meters). Flat surfaces are identified using the depth values. The server 123 may be configured to analyze the image and compare image regions to the threshold size.

Alternatively, the server 123 may perform an image processing algorithm on the image to identify objects of interest. The image processing algorithm may incorporate one or more of edge detection, object recognition, optical character recognition, or feature extraction. Edge detection identifies changes in brightness, which corresponds to discontinuities in depth, materials, or surfaces in the image. Object recognition identifies an object in an image using a set of templates for possible objects. The template accounts for variations in the same object based on lighting, viewing direction, and/or size. Optical character recognition may identify one or more alphanumeric characters on the movable object. Feature extraction reduces an image into a set of feature vectors in order to identify an object in the image. Points of interest in augmented reality may be used.

As shown in FIG. 4, the building 154 and the building 155 have been identified as an object of interest. The composite image 151, which may have originated from an image bubble, may have already included lower detailed versions of the building 154 and the building 155. However, images bubble 152 and image bubble 153 are closer the building 154 and the building 155, respectively, and include data with a greater spatial resolution. A depth map is used to rotate the image data out of the perspective of the images bubble 152 and image bubble 153 and/or resize the data for alignment with the composite image 151. Thus, the composite image 151 becomes an enhanced resolution image.

Figure 5:
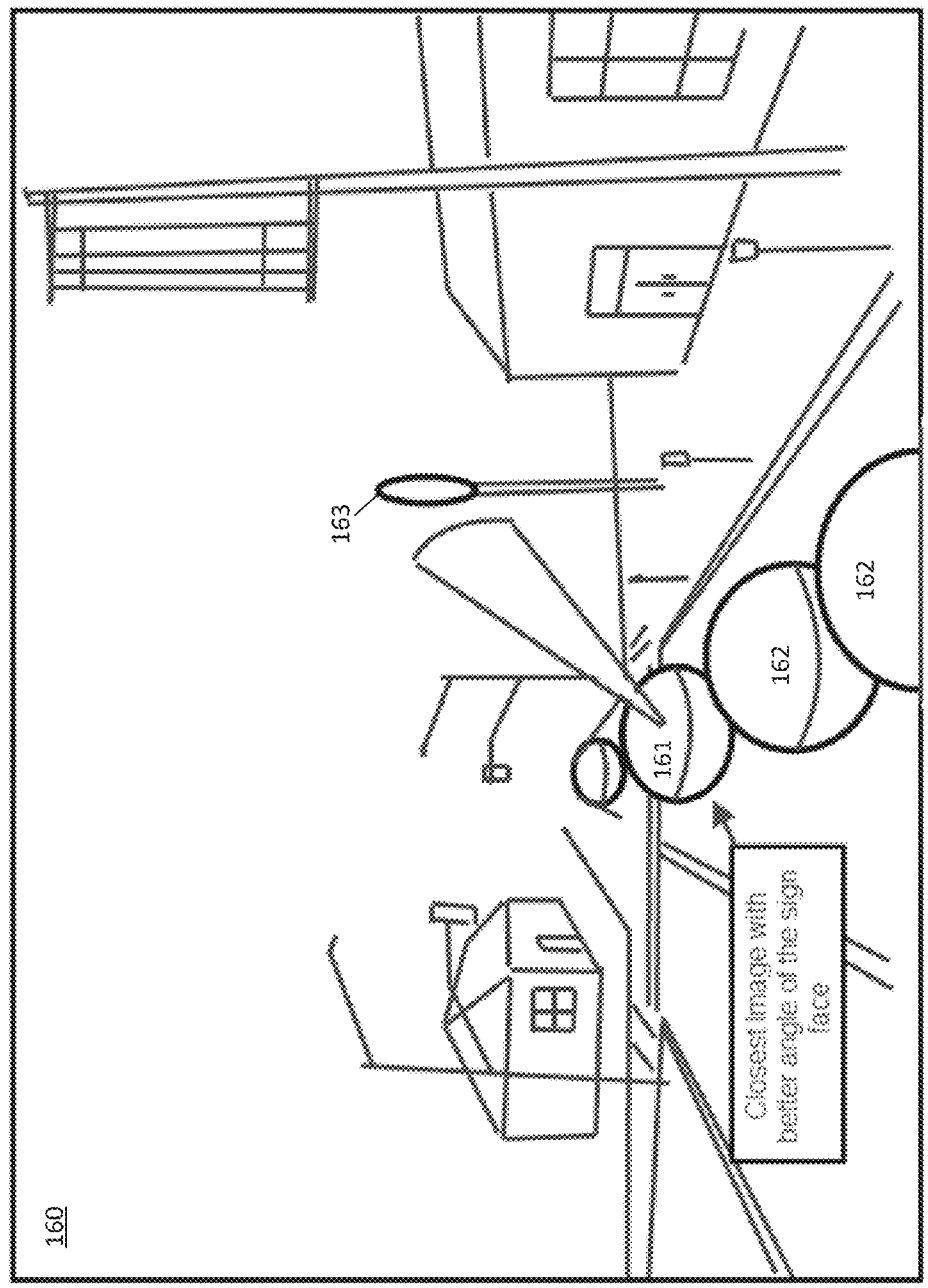
FIG. 5 illustrates an exemplary alternate view selection.

FIG. 5 illustrates an exemplary alternate view selection. A geographic region 160 includes a road, various buildings, and a sign 163. The sign 163 is an object of interest. Image bubbles 161-162 are illustrated for reference and are not actually visible in the geographic region 160. The view of a current image is shown by the geographic region 160. The current image may be a two-dimensional perspective extracted from an image bubble. This view may be from an interactive visual display from inside the image bubble. The edge of the sign 163 is visible in the current image. However, the sign 163 may have a relatively low spatial resolution or the sign 163 may be at an angle that makes the sign 163 not readable or otherwise blocked in the current image.

The server 123 is configured to receive a user or processor selection for an object of interest such as the sign 163. The selection may describe a point on the two-dimensional perspective. The server 163 determines the three-dimensional location of the selected point by accessing a depth map associated for a depth value. The server 123 selects the optimal image bubble. The position and orientation of the image bubble is used to compute its orientation relative to the selected 3D point. This computation determines the precise section of the image bubble that contains the view of the sign. A view of the object of interest is rendered from the optimal image bubble. The portion of the spherical image of the image bubble is projected onto a 2D image plane and delivered to the client.

Alternate algorithms to determine the optimal image bubble include a distance algorithm, an indexing algorithm, a surface normal algorithm, and a line of sight algorithm. Each of the example algorithms may be performed by the server 125, the mobile device 122, or the workstation 128. In each of the algorithms, a geographically referenced location is determined from the selection of the point. The set of image bubbles 131 are identified based on the geographically referenced location.

In the distance algorithm, a distance of each of the set of image bubbles 131 to the selected point is determined. The distance may be determined using two or three location components in the Cartesian coordinate system. The distance may be calculated as the square root of the sum of the squared differences of each coordinate of the location of the image bubble and the location of the point. The distances are compared, and the image bubble having the smallest distance to the three-dimensional rendering is selected as the optimum image bubble.

In the indexing algorithm, a lookup table associates each of the set of image bubbles 131 with one or more addresses, geographic locations, address range, or geographic location range. The lookup table may be stored in database 123 or internally to the mobile device 122 or server 125. The lookup table is queried with an address or the coordinates of a geographic location and returns the optimum image bubble.

The surface normal algorithm analyzes the direction of the selected surface plane and selects an image that best faces the surface. For example, if a billboard sign (perpendicular to the road) were selected, the closest image may only view the sign from the side of the billboard. In such a case, the billboard would not be readable from such a steep angle. Instead, the surface normal of the billboard selection is used to make sure the closest image bubble is taken than also views the billboard straight on instead of the front the side. The algorithm may also take into account the original viewpoint's view angle and location.

The line of sign algorithm utilizes depth information to determine the optimum image bubble 181. The depth information, which may be LiDAR data or another depthmap, describes a distance from the location where the depth information was collected to an object at every angle. The server 125, the mobile device 122, or the workstation 128 is configured to compare the depth information to the geographically referenced location determined from the selection of the point. If the depth information and the geographically reference location are within a threshold of each other, the image bubble has a line of sight to the selected point. Each of the image bubbles with line of sight may be considered a preferred image bubble. The server 125, the mobile device 122, or the workstation 128 may subsequently apply the distance algorithm to select the closest image bubble from among the preferred image bubbles with line of sight. Alternatively or additionally, the selected image bubble from the preferred image bubbles is determined based on a desired perspective or angle of view. Alternatively, a polygon model may also be used to determine line-of-sight.

Figure 6:
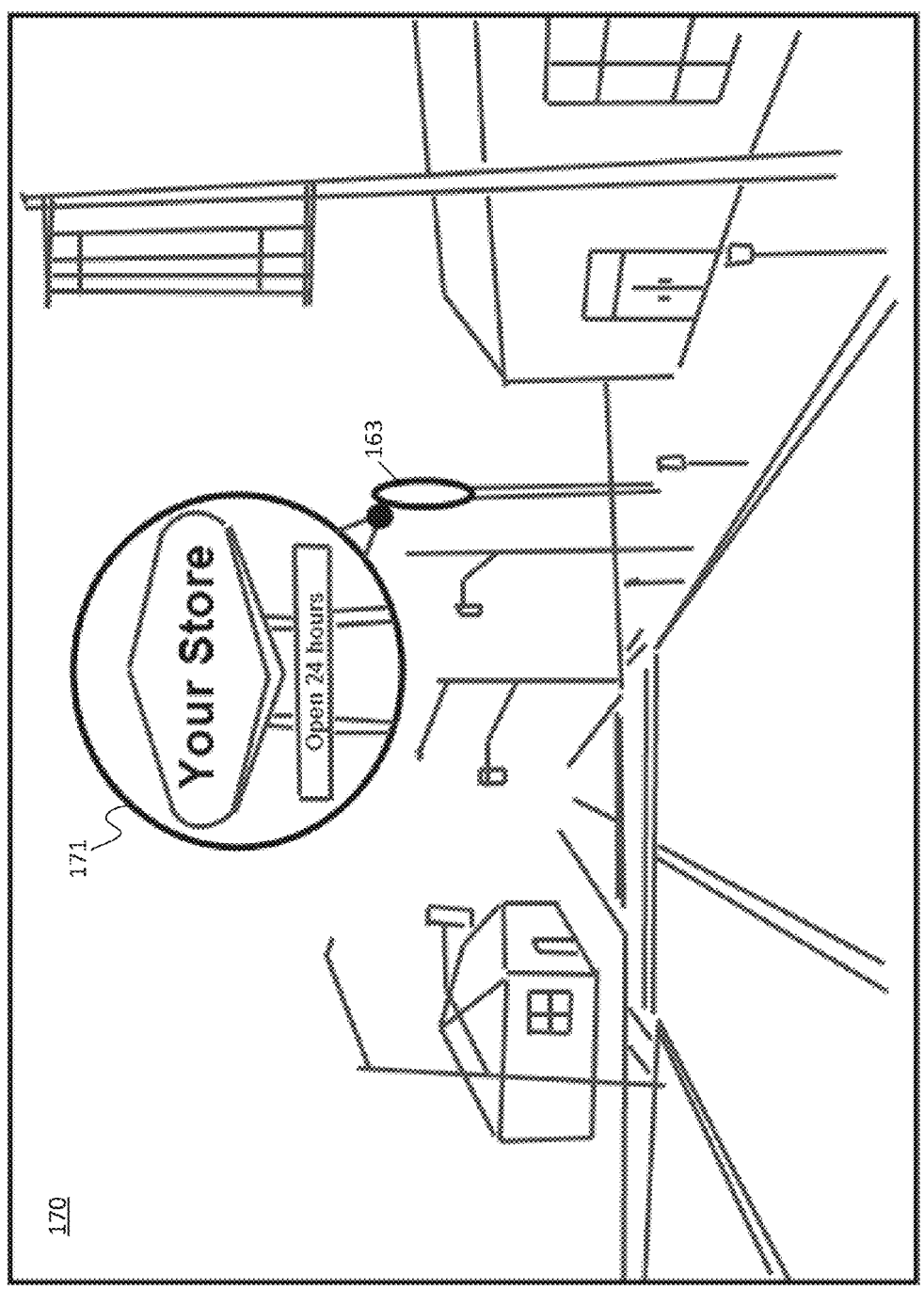
FIG. 6 illustrates an exemplary display of the alternate view selection of FIG. 5.

FIG. 6 illustrates an exemplary display of the alternate view selection of FIG. 5. The server 123 incorporates the view of the object into the original two-dimensional perspective as a peek view 171. The peek view 171 may be a picture-in-picture view of the object of interest. A display 170 includes the combination of the original two-dimensional perspective view of a portion of the current image bubble and an inset of the object of interest extracted from another image bubble.

Figure 7:
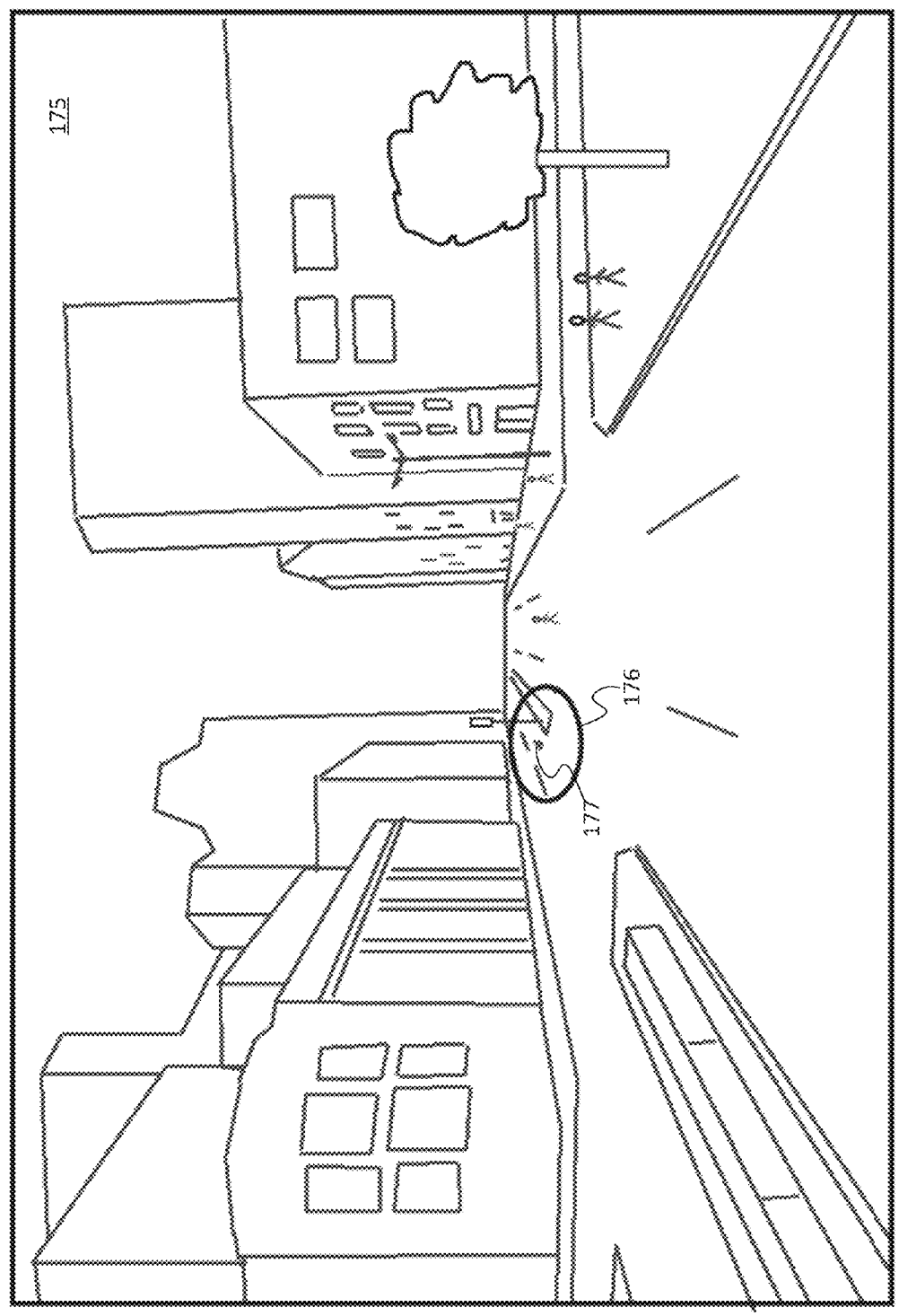
FIG. 7 illustrates another exemplary alternate view selection.

FIG. 7 illustrates another exemplary alternate view selection. A panoramic image 175 illustrates a geographic region include pedestrians, a roadway, and various buildings. The panoramic image 175 was collected from a distance and angle such that detail in the area shown by circle 176 has low detail or spatial resolution. Specifically, the road marking 177 cannot be identified.

Figure 8:
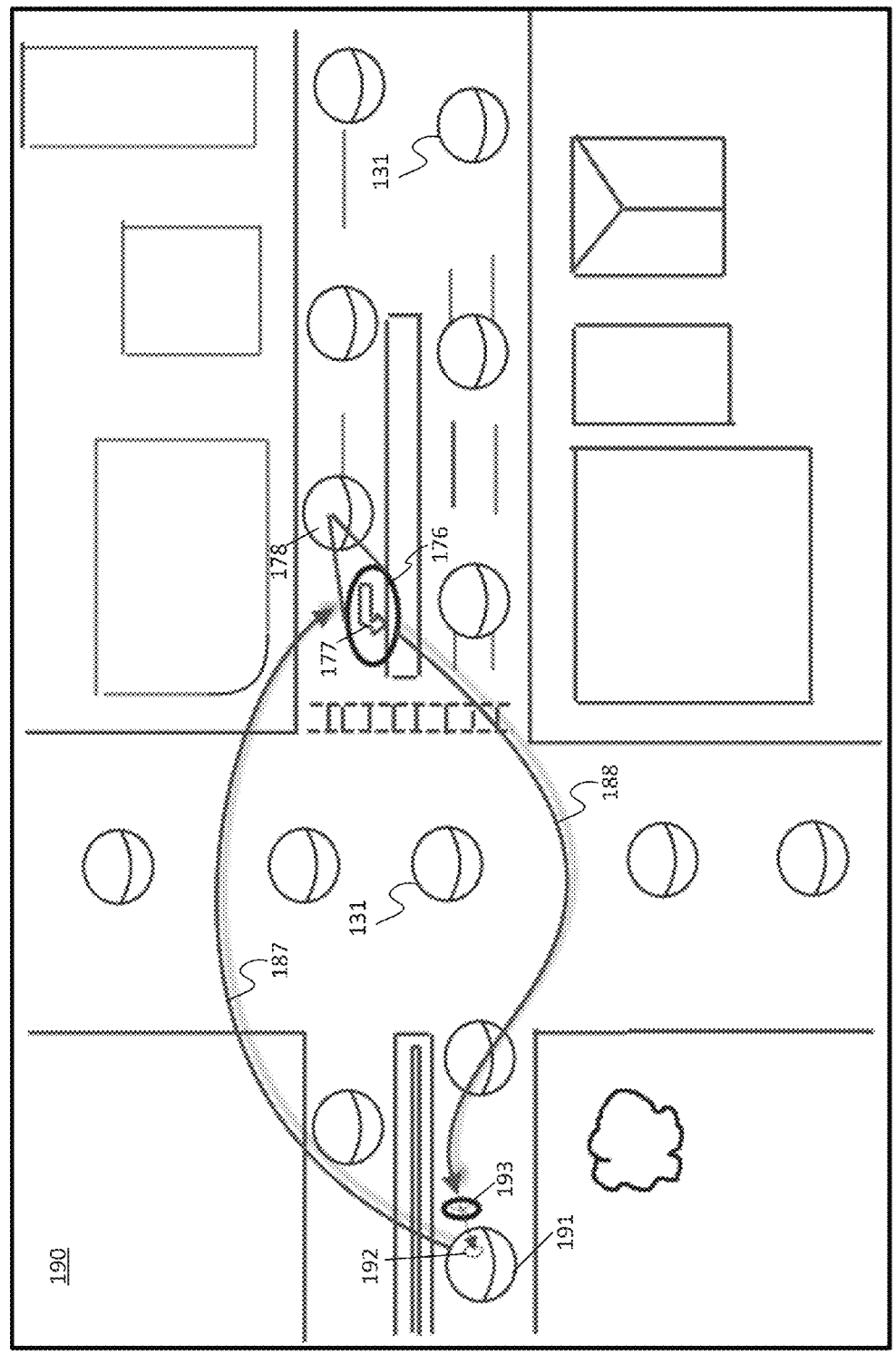
FIG. 8 illustrates an exemplary overhead view of FIG. 7.

FIG. 8 illustrates an exemplary overhead view 190 of the area near panoramic image 175 of FIG. 7. Various image bubbles 131 were collected at different locations along the roadway. A current image bubble 191 is the image bubble that corresponds to the panoramic image 175. A selection is received at screen location at 177 in FIG. 7 which corresponds to an area shown by circle 192. As illustrated by arrow 187, the selection corresponds to the 3D location area shown by circle 176. The server determines the 3D location of the selection using a depthmap. The image bubbles 131 are analyzed to determine which image bubble 131 is closest to the selected point. The closest image bubble 178 is chosen, and image data, 177, is extracted from the closest image bubble 178. As shown by the arrow 188, the extracted data is correlated with the current image bubble 191 at a portion marked by circle indicated the alternate view selection 193. The extracted image is overlaid on the original view, 191, as an inset image overlay and is placed at the location of the original pick point, 192.

Figure 9:
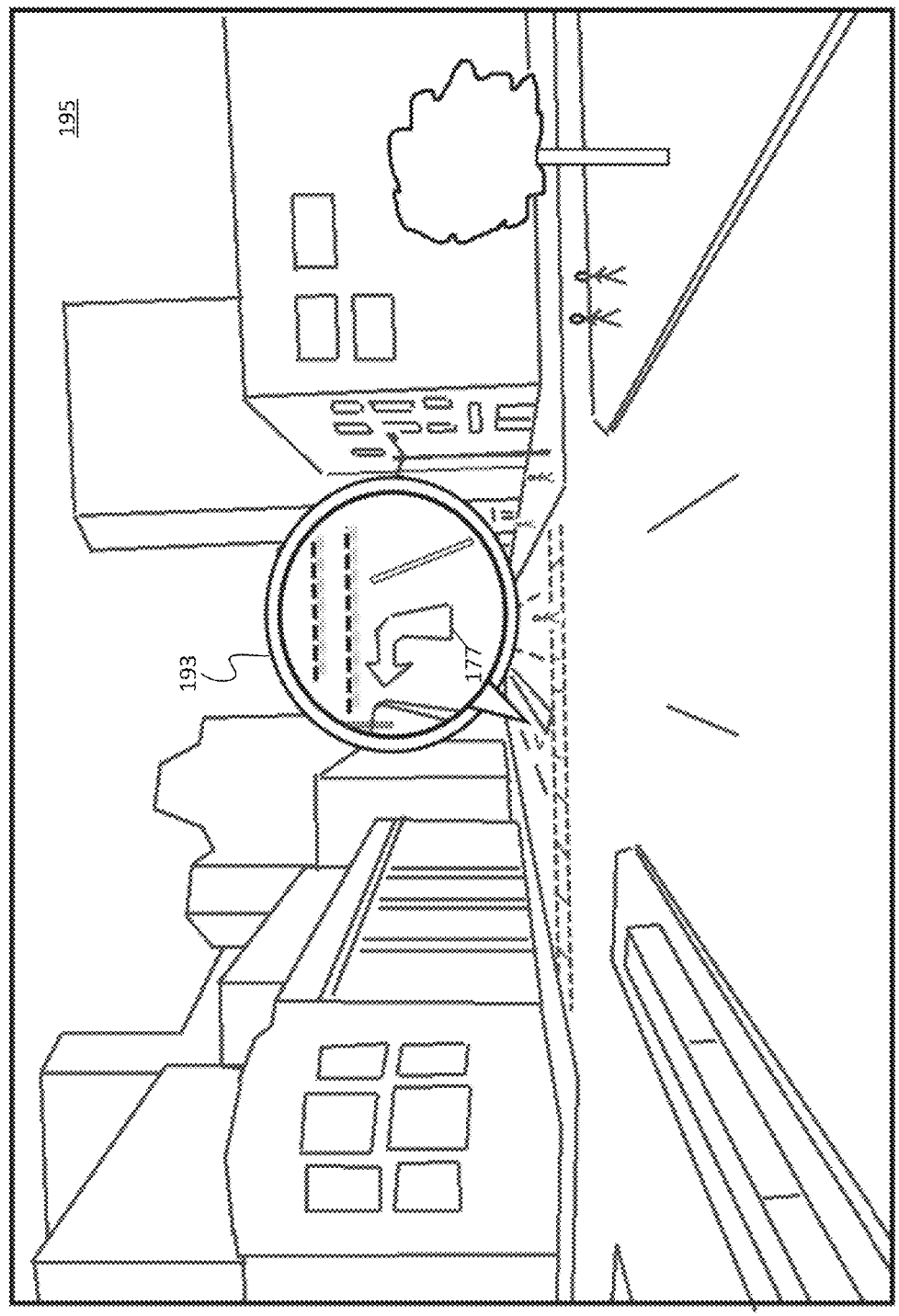
FIG. 9 illustrates an exemplary display of the alternate view selection of FIG. 7.

FIG. 9 illustrates an exemplary display of the alternate view selection of FIG. 7. The panoramic image 195, which may be panoramic image 175 that has been enhanced, includes the alternate view selection 193 including data extracted from the closest image bubble 178. Accordingly, the road marking 177 is clearly shown as left turn arrow. The images in the alternate view selection 193.

Figure 10:
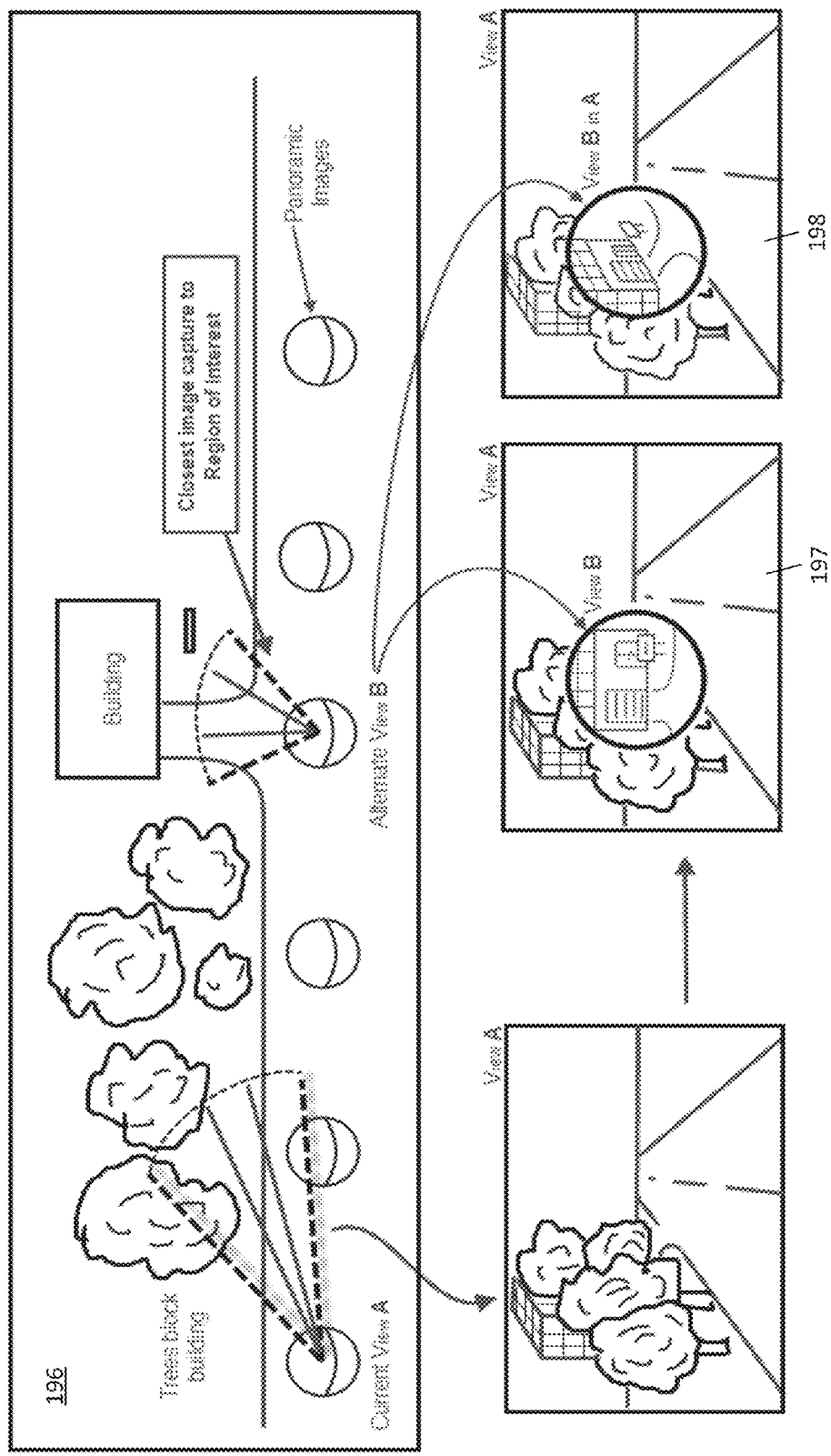
FIG. 10 illustrates another exemplary display of an alternative view selection including a see-through model.

FIG. 10 illustrates another alternative view display. The example of FIG. 10 includes a top-down view 196 and a see-through model. The see-through model illustrates that alternate viewpoints may have a view of objects not visible from the original perspective view. Perspective View A shows the original viewpoint. The building is obstructed by trees. In this case, a two-dimensional region is defined around the building which indicates which part of the scene is desired to always be visible. This region may be defined by the user, or other map, navigation, or destination planning algorithm. An Alternate View bubble B was chosen as the best view of the selected region around the building. The alternative view display 197 illustrates that the two viewpoints are combined to provide visibility of the building through the trees The alternative view display 197 displays the alternate viewpoint from the perspective of image bubble B. This inset image provides both a higher resolution image and a better view angle of the building than the original View A.

In an alternate implementation, the alternative view display 198 demonstrates that the alternate view is perspective corrected to make it appear as part of the original View A. This may be accomplished by using a homography perspective transformation between the two given view perspectives. The homography is used along with the image depth maps to generate a perspective correct three-dimensional image transformation. In addition the depth maps provide a way to know which pixels should from View B should be mapped to View A. The depthmap from View B is used to determine the three dimensional location of each color pixel in image B. If the 3D location falls outside the selected region around the building, the pixel is not included. Further, the depthmap from image A may be used to compare the alternate view pixels to the corresponding pixels in view A. From View A, the distance of both pixels (from View A and B) are compared. If pixel B is further than pixel A, then pixel B is hidden from View A. An algorithm uses this comparison to composite the two images together. For example, pixels that were original hidden may be slightly dimmed to indicate they are 'see-through' pixels.

Figure 11:
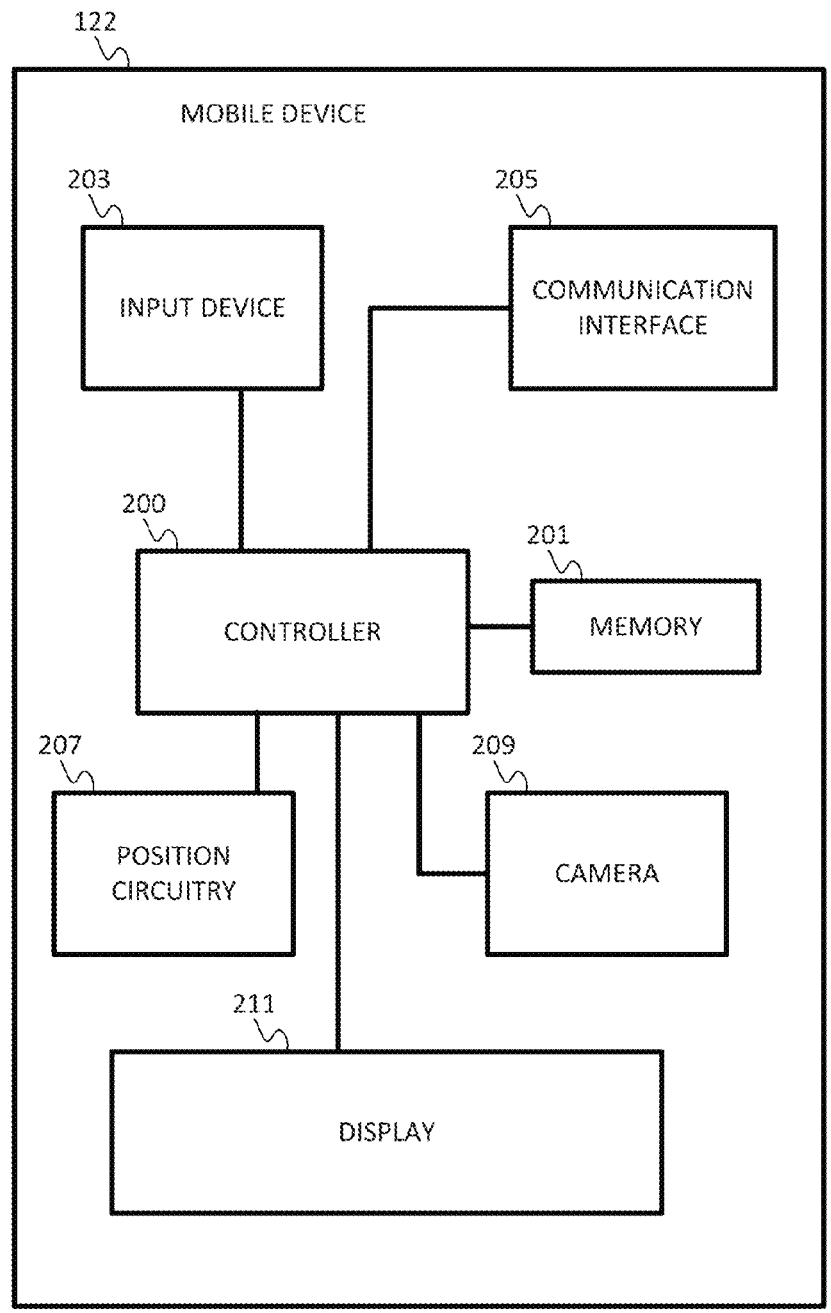
FIG. 11 illustrates an exemplary mobile device of the navigation system of FIG. 1.

FIG. 11 illustrates an exemplary mobile device 122 of the navigation system of FIG. 2. The mobile device 122 may be referred to as a navigation device. The mobile device 122 includes a controller 200, a memory 201, an input device 203, a communication interface 205, position circuitry 207, a camera 209, and a display 211. The workstation 128 may include at least a memory and processor and may be substituted for the mobile device 122 in the following endpoint-based embodiments. In the following endpoint-based embodiments, the mobile device 122 or the workstation 128 performs a majority of the processing.

As an alternative to the example above in which the server 125 access the image bubbles and transmits only the image data necessary to the mobile device 122, the memory 201 may be configured to store image bubbles. The image bubbles stored at memory 201 may be a small set of image bubbles needed for the current location of the mobile device 122. The image bubbles are referenced to geographic locations. The geographic location of each image bubble may be the location from which the image bubble was collected. The memory 201 may also store road segments and nodes, as discussed above, and store partial image bubbles or renderings of geographic regions.

The input device 203 is configured to receive a selection of a point on a panoramic image of a geographic region. The input device 203 may be one or more buttons, keypad, keyboard, mouse, stylist pen, trackball, rocker switch, touch pad, voice recognition circuit, or other device or component for inputting data to the mobile device 122. The input device 203 and the display 211 may be combined as a touch screen, which may be capacitive or resistive. The display 211 may be a liquid crystal display (LCD) panel, light emitting diode (LED) screen, thin film transistor screen, or another type of display.

The controller 200, which may be referred to as a processor, is configured to access a depth map from the memory 201 or another database. The depth map is associated with a two-dimensional perspective, such as a panoramic image, which may be a photograph. The controller 200 is configured to choose a depth value from the depth map that corresponds to a point selected from the two-dimensional perspective. The controller 200 is configured to select a portion of an image bubble based on the depth value. The selection may be based on distance, line of sight, or an index. A portion of the selected image bubble is incorporated into the two-dimensional perspective.

The incorporation of the portion of the image bubble into the two-dimensional perspective makes take many forms. In one example, the resulting image is a collage of multiple image bubbles. In another example, the incorporation is a picture-in-picture or window that is positioned near the selected point.

The size of the portion of the selection image bubble may be predetermined. Alternatively, the size of the portion of the image bubble may be selectable by the user. For example, the size may be set via the input device 203 or another user interface. In addition, the point on the two-dimensional perspective or panoramic image is selected from the input device 203.

The selection of the optimal image bubble may be made by direct correlation in a table. For example, the memory 201 may store a table where each possible point on the virtual rendering of the geographic region is paired with or indexed by an image bubble. Alternatively, the selection of the optimal image bubble may be made via a selection algorithm. Examples selection algorithms are the distance algorithm, the indexing algorithm and the line of sight algorithm, discussed above, which may be performed by the controller 200.

The controller 200 may be configured to calculate a distance between a geographically referenced location of the selected point in the geographic region and each of the set of image bubbles stored in memory 201. The controller 200 may select the image bubble that is closest to the selected point as the optimal image bubble. Alternatively, the controller 200 determines whether a line of sight exists between the geographically referenced location of the selected point and a center of each of the plurality of image bubbles. The determination of whether a line of sight exists can be determined based on a depthmap generated from a location near the center of the image bubble.

The positioning circuitry 207 is optional and may be excluded for the map-related functions. The positioning circuitry 207 may include a Global Positioning System (GPS), Global Navigation Satellite System (GLONASS), or a cellular or similar position sensor for providing location data. The positioning system may utilize GPS-type technology, a dead reckoning-type system, cellular location, or combinations of these or other systems. The positioning circuitry 207 may include suitable sensing devices that measure the traveling distance, speed, direction, and so on, of the mobile device 122. The positioning system may also include a receiver and correlation chip to obtain a GPS signal. Alternatively or additionally, the one or more detectors or sensors may include an accelerometer built or embedded into or within the interior of the mobile device 122. The accelerometer is operable to detect, recognize, or measure the rate of change of translational and/or rotational movement of the mobile device 122. The mobile device 122 receives location data from the positioning system. The location data indicates the location of the mobile device 122.

Figure 12:
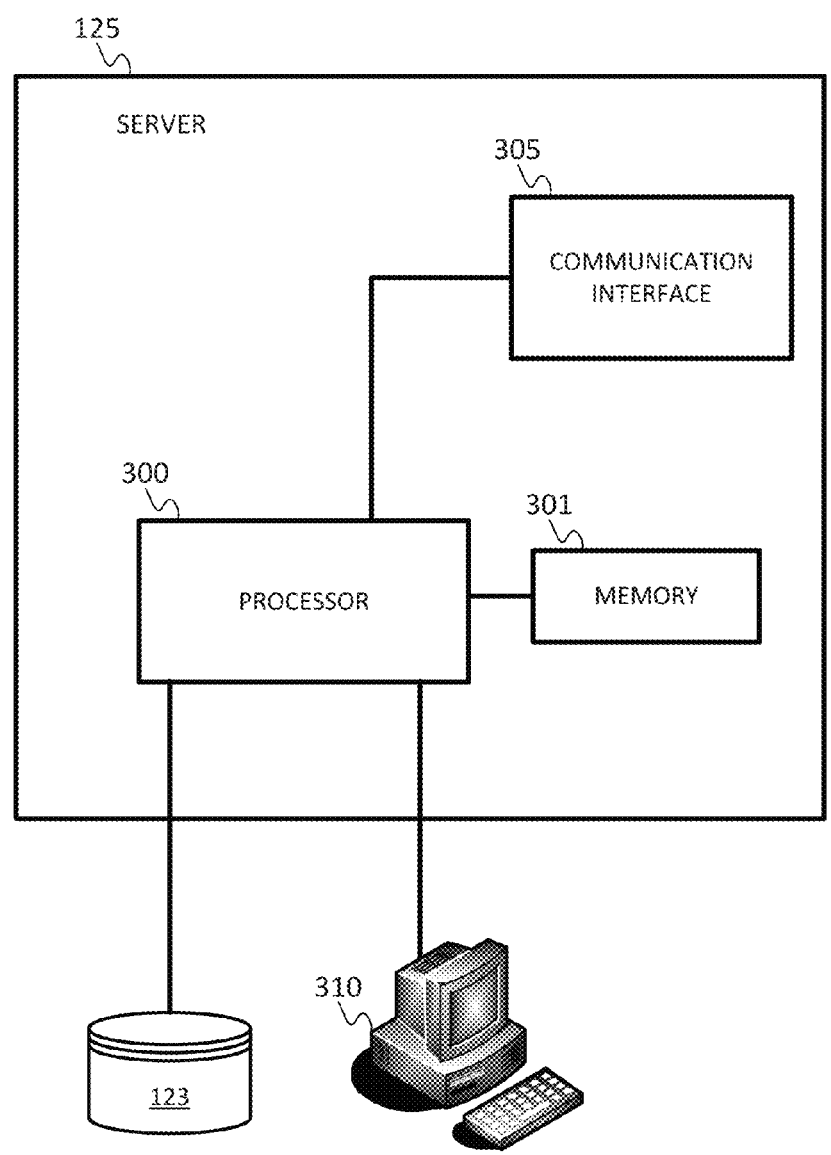
FIG. 12 illustrates an exemplary server of the navigation system of FIG. 1.

FIG. 12 illustrates an exemplary server 125 of the navigation system of FIG. 2. The server 125 includes a processor 300, a communication interface 305, and a memory 301. The server 125 may be coupled to a database 123 and a workstation 310. The database 123 may be a geographic database as discussed above. The workstation 310 may be used as an input device for the server 125. In addition, the communication interface 305 is an input device for the server 125. The communication interface 305 receives data indicative of use inputs made via the workstation 128 or the mobile device 122. In the following endpoint-based embodiments, the server 125 performs a majority of the processing.

The memory 301 stores multiple panoramic images. The panoramic images may have been collected at street level or from an aerial viewpoint. The panoramic images overlap such that objects in one panoramic image may appear in one or more other panoramic images. The communication interface 305 is configured to transmit panoramic images to the workstation 310 or the mobile device 122.

The memory 301 also stores depth maps. The processor 300 queries a depth map using a point selected from a panoramic image. The horizontal and vertical locations on the panoramic image are two coordinates for the point. A depth value resulting from the query of the depth map provides a third coordinate. The third coordinate indicates how far the object corresponding to the selected point is from the location where the depth map and the panoramic image were captured. The third coordinate alternatively may be referenced to another coordinate system (e.g., a reference plane in the panoramic image).

The processor 300 determines an optimal image bubble for the point based on the depth value according to any of the algorithms above. The processor 300 incorporates at least a portion of the image bubble into the panoramic image. The incorporation is an enhancement of the panoramic image. The enhancement may increase the spatial resolution of the panoramic image in an area surrounding the object corresponding to the selected point. The enhancement may augment the panoramic image with an insert or zoomed-in view of the object corresponding to the selected point.

The processor 300 may calculate the rotation of the portion of the image bubble from the perspective of the image bubble to the perspective of the panoramic image using homography. Homography is a geometric process including is an invertible transformation of a projective space. A homograph describes the arrangement of a point or a line from one perspective to another. Using homography and the depth map, the processor 300 rotates and sizes the portion of the image bubble to align with the panoramic image.

The processor 300 may also manipulate the portion of the image bubble based on user commands. The user commands may originate with the mobile device 122 or the workstation 310. A zoom commands may increase or decrease the size of the portion of the image bubble. A rotate command changes the view angle of the incorporated image bubble by rotating the image bubble about the center of the image bubble. The rotate command may rotate the incorporated image bubble away from the selected point. For example, a left or right arrow key or mouse movement pivots the image bubble left and right, and an up or down arrow key or mouse movements pivots the image bubble up and down. In this way, the image bubble is pivoted to show subject matter (e.g., buildings) at locations other than the selected point.

A pivot command or a source image control mode causes lateral movement in the window. The processor 300 selected a subsequent image bubble to display in the window. The subsequent window may be automatically oriented to view the selected point. For each subsequent image bubble, the processor 300 is configured to generate an image including at least a portion of the new image bubble in the window.

A perspective scroll command also switches between source images even in the subsequent images do not view the selected point. A user or mobile device inputs a direction, and the processor 300 selects subsequent image bubbles maintaining a centered or fixed view. The perspective scroll may be achieved using a continuous image as described in more detail by application Ser. No. 13/340,923, titled "Path Side Imagery" and filed Dec. 30, 2011, which is incorporated by reference in its entirety.

The controller 200 and/or processor 300 may include a general processor, digital signal processor, an application specific integrated circuit (ASIC), field programmable gate array (FPGA), analog circuit, digital circuit, combinations thereof, or other now known or later developed processor. The controller 200 and/or processor 300 may be a single device or combinations of devices, such as associated with a network, distributed processing, or cloud computing.

The memory 201 and/or memory 301 may be a volatile memory or a non-volatile memory. The memory 201 and/or memory 301 may include one or more of a read only memory (ROM), random access memory (RAM), a flash memory, an electronic erasable program read only memory (EEPROM), or other type of memory. The memory 201 and/or memory 301 may be removable from the mobile device 100, such as a secure digital (SD) memory card.

The communication interface 205 and/or communication interface 305 may include any operable connection. An operable connection may be one in which signals, physical communications, and/or logical communications may be sent and/or received. An operable connection may include a physical interface, an electrical interface, and/or a data interface. The communication interface 205 and/or communication interface 305 provides for wireless and/or wired communications in any now known or later developed format.

Figure 13:
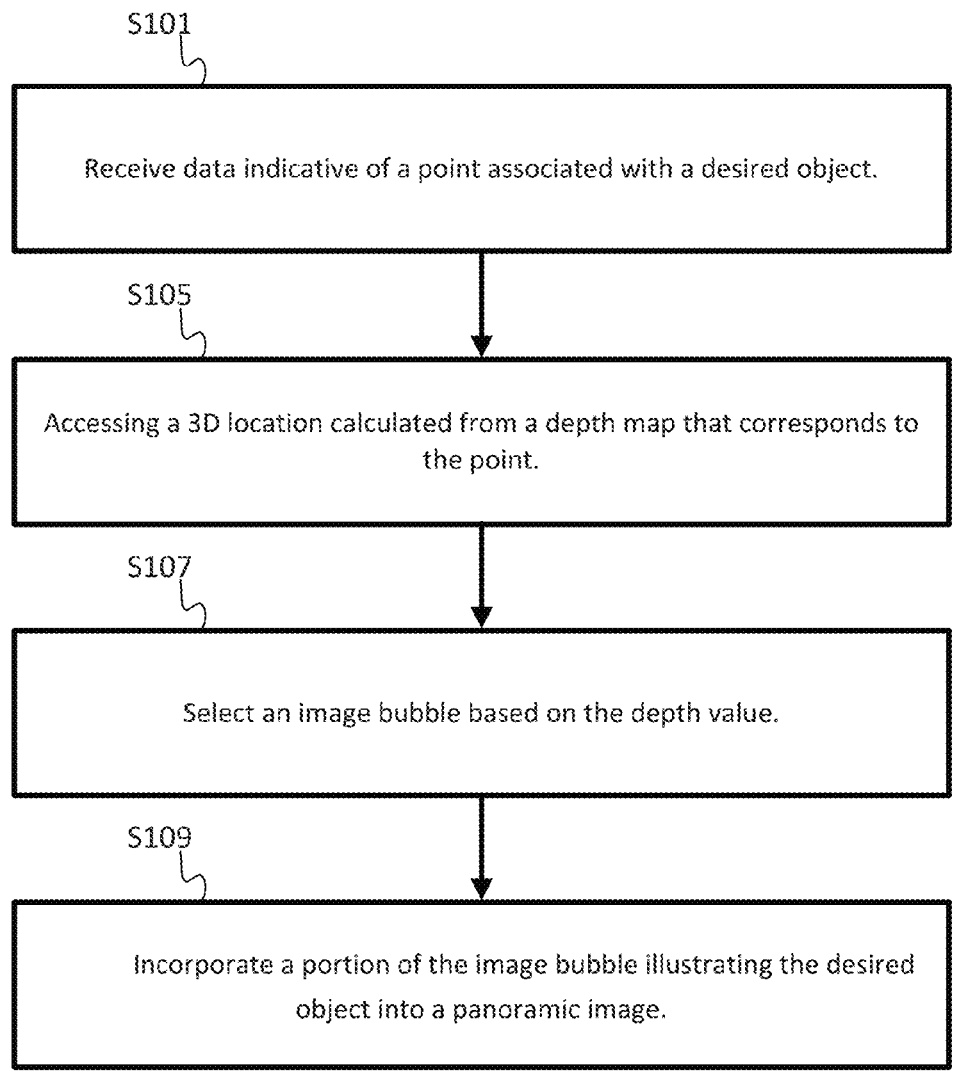
FIG. 13 illustrates an example flowchart for alternate viewpoint image enhancement.

FIG. 13 illustrates an example flowchart for alternate viewpoint image enhancement. The acts of the flowchart may be performed by any combination of the server 125, the mobile device 122 and the workstation 128, and the term controller may refer to the processor of any of the devices. Additional, different, or fewer acts may be provided. For example, acts associated with the different modes may be provided.

An image is generated from an image bubble as part of navigation or mapping. Any selection or process may be used. Alternatively, an image is to be generated.

At act S101, the controller receives data indicative of a point. The point may be selected automatically by the controller based on subject matter surrounding the point. The subject matter may be identified as a flat surface, a building, a sign, or another specified object according to image processing techniques. The point may be selected via user input. The user input may indicate a desired area for enhanced detail or alternative viewpoint. For example, the user may be requesting to read a sign or other words in the distance or to see an objected that is obstructed in the current view. The selection of the point may be part of a navigation application. For example, the selected point may correspond to a destination or a point of interest along a route.

At act S105, the controller accesses a three-dimensional location. The three-dimensional is calculated from a depth map by the controller or ahead of time. A depth value from the depth map corresponds to the point on the two-dimensional perspective and allows the controller to determine precisely where in three-dimensional space the point is located. The depth map may be a three-dimensional model. The depth map may be collected using LiDAR or another optical distancing system.

The depthmap may also be used to determine the surface normal and/or the size of the object. Therefore, the image bubble is selected using a 3D point, surface normal, surface scale. The current view vector may also be used to assist the image selection.

At act S107, the three-dimensional spatial location of the point is used to select an image bubble. The image bubble may be the closest to the spatial location or the closest to the spatial location without an obstruction. Alternatively, the image bubble may be indexed according to the spatial location in a lookup table or have another relationship with the point.

At act S109, the controller incorporates at least a portion of the image bubble into the two-dimensional perspective. The portion of the image bubble illustrates the object that includes the selected point. The controller may build a composite image from the image bubble by combining the portion of the image bubbles with other image bubbles. The portion of the image bubble may be rotated to align with the perspective of the two-dimensional perspective.

Alternatively, the controller may generate an image including the two-dimensional view with a picture-in-picture including the portion of the image bubble. The selected point and surrounding area are shown with a greater spatial resolution than other portions of the two-dimensional view. The controller may rotate or zoom the portion of the image bubble according to user input. The controller may pivot or laterally scroll between adjacent image bubbles according to user input.

Figure 14:
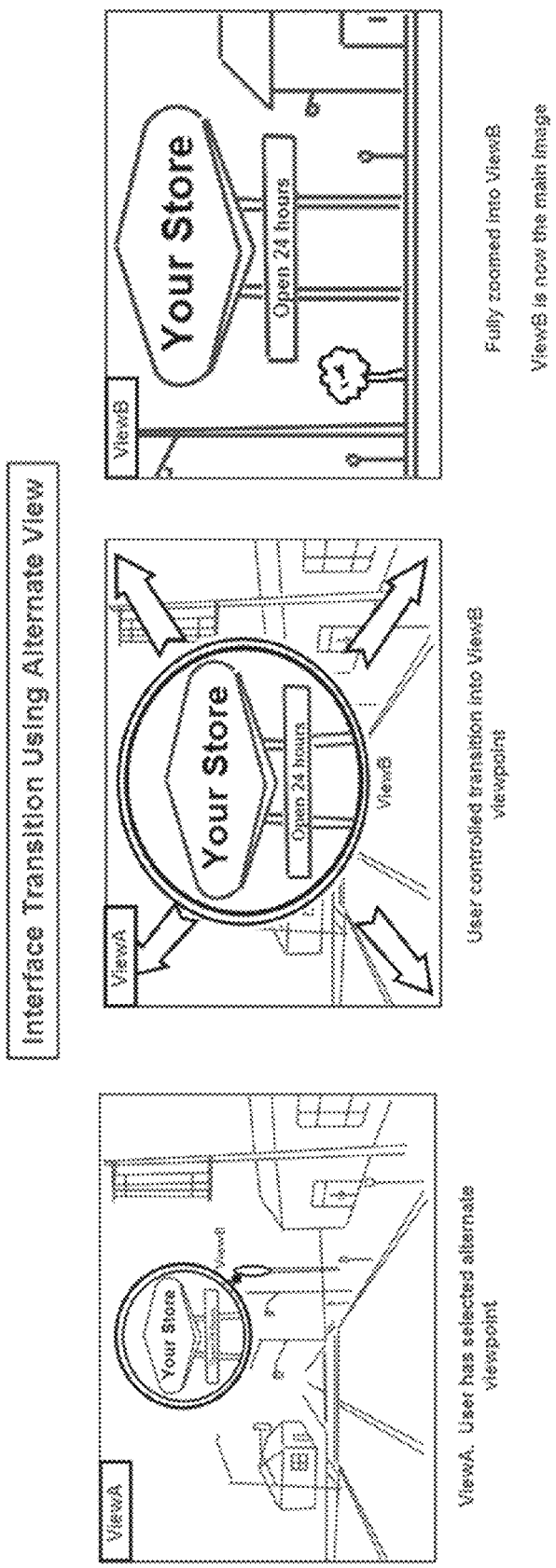
FIG. 14 illustrates an exemplary transition sequence for alternate viewpoint image enhancement.

FIG. 14 illustrates an exemplary transition sequence for alternate viewpoint image enhancement. The alternate view display is used as a transition to move between image bubbles. A user navigates the current image bubble my exploring the scene of other viewpoints using the alternate view inset. When a desired alternate viewpoint is chosen, a transition effect takes the user to the alternate viewpoint and assigns that image bubble as the new main viewpoint. A smooth transition is achieved by growing the alternate view inset window until it fills the entire screen as shown in FIG. 14. That is, the server 125 or mobile device 122 may be configured to receive a user command to switch image bubbles and access a subsequent image bubble from memory based on the command.

This type of transition allows the user to move through multiple image bubbles and multiple view angles seamlessly without the necessity of 3D geometry models. The transition is a type of 'portal' or teleportation in that the viewpoint moves to an alternate viewpoint location and direction without the need to travel thought 3D space. Even though the displayed view is at a different 3D location and orientation, there is no need for the transition to perform any real 3D travel or 3D rotation.

Figure 15:
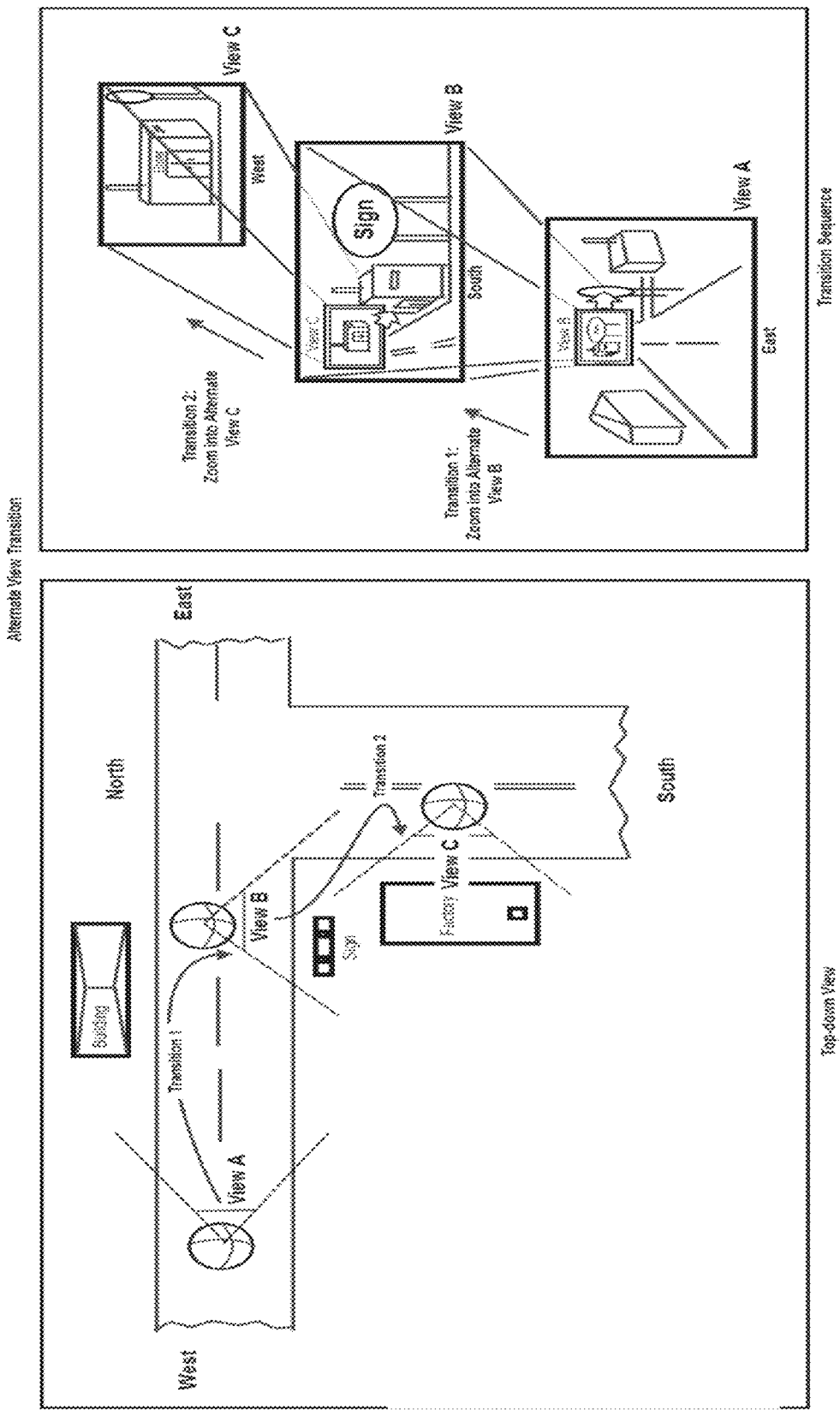
FIG. 15 illustrates an exemplary transition sequence with multiple points.

The alternate view point transition may involve any number of successive transitions between images and viewpoints. Thus the transition allows a free form image exploration of an entire scene. FIG. 15 illustrates two successive transitions between three image bubbles. The initial View A looks eastward down a road. The user selects an alternate view by picking the sign and the view is displayed in an inset window as view B. The user may then further modify the alternate view by pivoting the viewpoint of the alternate view. In the illustration, the alternate viewpoint faces south, looking at the sign. The user requests to zoom into the new viewpoint and the transition to View B occurs. The main interface now displays and manipulates the image bubble of View B. Note that the viewpoint now faces south instead of the original eastward view. The user selects another alternate view. This time by picking the factory as seen from View B. The alternate View C is generated and showing in the inset window. Next, the transition zooms to the View C and this view becomes the main view and looks westward. The two transitions resulted in moving the viewpoint location around a corner and looking at the front of the factory building. A history of transition may be stored either at the mobile device 122 or at the server 125 and unwound to move back to the previous views B and A.

The embodiments above may be applied to or combined with on demand overlays on three-dimensional renderings of buildings or other objects as described by co-pending U.S. application Ser. No. 13/536,589 and published as US 2014/0002440, titled "On Demand Image Overlay" to James D. Lynch filed Jun. 28, 2012, which is incorporated by reference in its entirety.

The network 127 may include wired networks, wireless networks, or combinations thereof. The wireless network may be a cellular telephone network, an 802.11, 802.16, 802.20, or WiMax network. Further, the network 127 may be a public network, such as the Internet, a private network, such as an intranet, or combinations thereof, and may utilize a variety of networking protocols now available or later developed including, but not limited to TCP/IP based networking protocols.

While the non-transitory computer-readable medium is shown to be a single medium, the term "computer-readable medium" includes a single medium or multiple media, such as a centralized or distributed database, and/or associated caches and servers that store one or more sets of instructions. The term "computer-readable medium" shall also include any medium that is capable of storing, encoding or carrying a set of instructions for execution by a processor or that cause a computer system to perform any one or more of the methods or operations disclosed herein.

In a particular non-limiting, exemplary embodiment, the computer-readable medium can include a solid-state memory such as a memory card or other package that houses one or more non-volatile read-only memories. Further, the computer-readable medium can be a random access memory or other volatile re-writable memory. Additionally, the computer-readable medium can include a magneto-optical or optical medium, such as a disk or tapes or other storage device to capture carrier wave signals such as a signal communicated over a transmission medium. A digital file attachment to an e-mail or other self-contained information archive or set of archives may be considered a distribution medium that is a tangible storage medium. Accordingly, the disclosure is considered to include any one or more of a computer-readable medium or a distribution medium and other equivalents and successor media, in which data or instructions may be stored.

In an alternative embodiment, dedicated hardware implementations, such as application specific integrated circuits, programmable logic arrays and other hardware devices, can be constructed to implement one or more of the methods described herein. Applications that may include the apparatus and systems of various embodiments can broadly include a variety of electronic and computer systems. One or more embodiments described herein may implement functions using two or more specific interconnected hardware modules or devices with related control and data signals that can be communicated between and through the modules, or as portions of an application-specific integrated circuit. Accordingly, the present system encompasses software, firmware, and hardware implementations.

In accordance with various embodiments of the present disclosure, the methods described herein may be implemented by software programs executable by a computer system. Further, in an exemplary, non-limited embodiment, implementations can include distributed processing, component/object distributed processing, and parallel processing. Alternatively, virtual computer system processing can be constructed to implement one or more of the methods or functionality as described herein.

Although the present specification describes components and functions that may be implemented in particular embodiments with reference to particular standards and protocols, the invention is not limited to such standards and protocols. For example, standards for Internet and other packet switched network transmission (e.g., TCP/IP, UDP/IP, HTML, HTTP, HTTPS) represent examples of the state of the art. Such standards are periodically superseded by faster or more efficient equivalents having essentially the same functions. Accordingly, replacement standards and protocols having the same or similar functions as those disclosed herein are considered equivalents thereof.

A computer program (also known as a program, software, software application, script, or code) can be written in any form of programming language, including compiled or interpreted languages, and it can be deployed in any form, including as a standalone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application specific integrated circuit).

As used in this application, the term 'circuitry' or 'circuit' refers to all of the following: (a) hardware-only circuit implementations (such as implementations in only analog and/or digital circuitry) and (b) to combinations of circuits and software (and/or firmware), such as (as applicable): (i) to a combination of processor(s) or (ii) to portions of processor(s)/software (including digital signal processor(s)), software, and memory(ies) that work together to cause an apparatus, such as a mobile phone or server, to perform various functions) and (c) to circuits, such as a microprocessor(s) or a portion of a microprocessor(s), that require software or firmware for operation, even if the software or firmware is not physically present.

This definition of 'circuitry' applies to all uses of this term in this application, including in any claims. As a further example, as used in this application, the term "circuitry" would also cover an implementation of merely a processor (or multiple processors) or portion of a processor and its (or their) accompanying software and/or firmware. The term "circuitry" would also cover, for example and if applicable to the particular claim element, a baseband integrated circuit or applications processor integrated circuit for a mobile phone or a similar integrated circuit in server, a cellular network device, or other network device.

Processors suitable for the execution of a computer program include, by way of example, both general and special purpose microprocessors, and anyone or more processors of any kind of digital computer. Generally, a processor receives instructions and data from a read only memory or a random access memory or both. The essential elements of a computer are a processor for performing instructions and one or more memory devices for storing instructions and data. Generally, a computer also includes, or be operatively coupled to receive data from or transfer data to, or both, one or more mass storage devices for storing data, e.g., magnetic, magneto optical disks, or optical disks. However, a computer need not have such devices. Moreover, a computer can be embedded in another device, e.g., a mobile telephone, a personal digital assistant (PDA), a mobile audio player, a Global Positioning System (GPS) receiver, to name just a few. Computer readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

To provide for interaction with a user, embodiments of the subject matter described in this specification can be implemented on a device having a display, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

Embodiments of the subject matter described in this specification can be implemented in a computing system that includes a back end component, e.g., as a data server, or that includes a middleware component, e.g., an application server, or that includes a front end component, e.g., a client computer having a graphical user interface or a Web browser through which a user can interact with an implementation of the subject matter described in this specification, or any combination of one or more such back end, middleware, or front end components. The components of the system can be interconnected by any form or medium of digital data communication, e.g., a communication network. Examples of communication networks include a local area network ("LAN") and a wide area network ("WAN"), e.g., the Internet.

The computing system can include clients and servers. A client and server are generally remote from each other and typically interact through a communication network. The relationship of client and server arises by virtue of computer programs running on the respective computers and having a client-server relationship to each other.

The illustrations of the embodiments described herein are intended to provide a general understanding of the structure of the various embodiments. The illustrations are not intended to serve as a complete description of all of the elements and features of apparatus and systems that utilize the structures or methods described herein. Many other embodiments may be apparent to those of skill in the art upon reviewing the disclosure. Other embodiments may be utilized and derived from the disclosure, such that structural and logical substitutions and changes may be made without departing from the scope of the disclosure. Additionally, the illustrations are merely representational and may not be drawn to scale. Certain proportions within the illustrations may be exaggerated, while other proportions may be minimized. Accordingly, the disclosure and the figures are to be regarded as illustrative rather than restrictive.

While this specification contains many specifics, these should not be construed as limitations on the scope of the invention or of what may be claimed, but rather as descriptions of features specific to particular embodiments of the invention. Certain features that are described in this specification in the context of separate embodiments can also be implemented in combination in a single embodiment. Conversely, various features that are described in the context of a single embodiment can also be implemented in multiple embodiments separately or in any suitable sub-combination. Moreover, although features may be described above as acting in certain combinations and even initially claimed as such, one or more features from a claimed combination can in some cases be excised from the combination, and the claimed combination may be directed to a sub-combination or variation of a sub-combination.

Similarly, while operations are depicted in the drawings and described herein in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

One or more embodiments of the disclosure may be referred to herein, individually and/or collectively, by the term "invention" merely for convenience and without intending to voluntarily limit the scope of this application to any particular invention or inventive concept. Moreover, although specific embodiments have been illustrated and described herein, it should be appreciated that any subsequent arrangement designed to achieve the same or similar purpose may be substituted for the specific embodiments shown. This disclosure is intended to cover any and all subsequent adaptations or variations of various embodiments. Combinations of the above embodiments, and other embodiments not specifically described herein, are apparent to those of skill in the art upon reviewing the description.

The Abstract of the Disclosure is provided to comply with 37 C.F.R. §1.72(b) and is submitted with the understanding that it will not be used to interpret or limit the scope or meaning of the claims. In addition, in the foregoing Detailed Description, various features may be grouped together or described in a single embodiment for the purpose of streamlining the disclosure. This disclosure is not to be interpreted as reflecting an intention that the claimed embodiments require more features than are expressly recited in each claim. Rather, as the following claims reflect, inventive subject matter may be directed to less than all of the features of any of the disclosed embodiments. Thus, the following claims are incorporated into the Detailed Description, with each claim standing on its own as defining separately claimed subject matter.

It is intended that the foregoing detailed description be regarded as illustrative rather than limiting and that it is understood that the following claims including all equivalents are intended to define the scope of the invention. The claims should not be read as limited to the described order or elements unless stated to that effect. Therefore, all embodiments that come within the scope and spirit of the following claims and equivalents thereto are claimed as the invention.

I claim:

1. A method comprising:
   receiving data indicative of a point on a two-dimensional perspective image, wherein the point is associated with a desired object;
   accessing, using a processor, a three-dimensional location computed from a depth map, wherein the depth map includes depth values for pixels of the two-dimensional perspective image;
   selecting, using the processor, an image bubble from a plurality of image bubbles based on the three-dimensional location computed from the depth map, wherein the plurality of image bubbles are panoramic images; and
   incorporating, using the processor, a window inset including at least a portion of the image bubble with the two-dimensional perspective image based on the depth map, wherein the at least the portion of the image bubble represents the desired object,
   wherein the at least the portion of the image bubble represents a different view angle than the two-dimensional perspective image.

2. The method of claim 1, further comprising:
   receiving a command to manipulate the at least the portion of the image bubble by view angle or zoom.

3. The method of claim 1, further comprising:
   receiving a command to switch to a subsequent image bubble; and
   incorporating at least a portion of the subsequent image bubble with the two-dimensional perspective image according to the command.

4. The method of claim 1, wherein incorporating the at least the portion of the image bubble with the two-dimensional perspective image comprises:
generating a final image including the two-dimensional perspective image and data derived from the at least the portion of the image bubble.

5. The method of claim 1, further comprising:
rotating the at least the portion of the image bubble to approximate the two-dimensional perspective image.

6. The method of claim 1, wherein incorporating the at least the portion of the image bubble with the two-dimensional perspective image comprises:
projecting the at least the portion of the image bubble on a three-dimensional model; and
transforming data from the three-dimensional model to the two-dimensional perspective image.

7. The method of claim 1, wherein detail from multiple image bubbles is incorporated with the two-dimensional perspective image.

8. The method of claim 1, wherein a first spatial resolution is associated with the desired object in the two-dimensional perspective image and a second spatial resolution is associated with the desired object in the image bubble, and wherein the first spatial resolution is less than the second spatial resolution.

9. The method of claim 1, wherein the at least the portion of the image bubble includes scenery obstructed in the two-dimensional perspective image.

10. An apparatus comprising:
a memory storing a plurality of image bubbles; and
a processor configured to access a three-dimensional location from a depth map associated with a two-dimensional image, select an image bubble from the plurality of image bubbles and select a portion of the selected image bubble, based on the three-dimensional location, to be incorporated, based on the depth map, with the two-dimensional image as a window inset, wherein the plurality of image bubbles are panoramic images, wherein a first resolution associated with the portion of the selected image bubble is greater than a second resolution associated with the two-dimensional image at the point selected from the two-dimensional image,
wherein the portion of the selected image bubble at the first resolution and the two-dimensional image at the second resolution are displayed together at the same time,
wherein the at least the portion of the image bubble represents a different view angle than the two-dimensional perspective image.

11. The apparatus of claim 10, wherein the point is selected from a user interface and the two-dimensional image is a photograph.

12. The apparatus of claim 10, wherein the processor is configured to rotate and size the portion of the image bubble to align with the two-dimensional image using the depth map.

13. The apparatus of claim 10, wherein detail from multiple image bubbles is added to the two-dimensional image.

14. The apparatus of claim 10, wherein the portion of the image bubble includes objects obstructed in the two-dimensional image.

15. The apparatus of claim 10, wherein the processor is configured to change the portion of the image bubble by rotating the image bubble about a center of the image bubble.

16. The apparatus of claim 10, wherein the processor is configured to access a subsequent image bubble according to input data and incorporate at least a portion of the subsequent image bubble into the two-dimensional image.

17. The apparatus of claim 16, wherein the portion of the subsequent image bubble includes an object corresponding to the point selected from the two-dimensional image.

18. A non-transitory computer readable medium including instructions that when executed are operable to:
determine a first image bubble associated with a first position and a first view angle, wherein the first image bubble includes data indicative of an object at a first spatial resolution;
identify a second image bubble associated with a second position and a second view angle in a region represented by the first image bubble, wherein the second image bubble includes data indicative of the object at a second spatial resolution;
generate an image with the first image bubble at the first view angle; and
incorporate at least a portion of the second bubble into the image as a window inset and according to a depth map associated with the first image, wherein the first image bubble and the second image bubble are panoramic images.

19. The non-transitory computer readable medium of claim 18, the instruction operable to:
query the depth map using a point selected from a panoramic image of the first image bubble to receive a depth value;
determine the second image bubble as being for the point based on the depth value, wherein the at least the portion of the second image bubble is incorporated with the panoramic image.

20. The non-transitory computer readable medium of claim 19, wherein the second spatial resolution is greater than the first spatial resolution.

* * * * *